US011461389B2

(12) United States Patent
Jehan et al.

(10) Patent No.: US 11,461,389 B2
(45) Date of Patent: *Oct. 4, 2022

(54) TRANSITIONS BETWEEN MEDIA CONTENT ITEMS

(71) Applicant: Spotify AB, Stockholm (SE)

(72) Inventors: Tristan Jehan, Brooklyn, NY (US); Rachel Bittner, New York, NY (US); Nicola Montecchio, Berlin (DE); Hunter McCurry, New York, NY (US); Minwei Gu, New York, NY (US); Gandalf Hernandez, New York, NY (US)

(73) Assignee: Spotify AB, Stockholm (SE)

( * ) Notice: Subject to any disclaimer, the term of this patent is extended or adjusted under 35 U.S.C. 154(b) by 105 days.

This patent is subject to a terminal disclaimer.

(21) Appl. No.: 17/013,102

(22) Filed: Sep. 4, 2020

(65) Prior Publication Data

US 2020/0401619 A1    Dec. 24, 2020

Related U.S. Application Data

(63) Continuation of application No. 15/469,048, filed on Mar. 24, 2017, now Pat. No. 10,803,118.

(Continued)

(51) Int. Cl.
*G06F 15/16*    (2006.01)
*G06F 16/683*    (2019.01)
(Continued)

(52) U.S. Cl.
CPC .......... *G06F 16/683* (2019.01); *G06F 16/635* (2019.01); *G10H 1/0033* (2013.01);
(Continued)

(58) Field of Classification Search
CPC ....... G10H 2240/075; G10H 2210/076; G10H 2210/081; G06V 20/47; G11B 27/031;
(Continued)

(56) References Cited

U.S. PATENT DOCUMENTS 5,918,223 A    6/1999    Blum et al.
7,678,984 B1    3/2010    Lamere
(Continued)

FOREIGN PATENT DOCUMENTS

EP    3035333 A1    6/2016

OTHER PUBLICATIONS

Ahmed et al., "Digging in the Crates: An Ethnographic Study of DJs' Work", May 10, 2012, CHI 2012, pp. 1805-1814.
(Continued)

*Primary Examiner* — Chris Parry
*Assistant Examiner* — Dixon F Dabipi
(74) *Attorney, Agent, or Firm* — Merchant & Gould P.C.

(57) ABSTRACT

A system of playing media content items determines transitions between pairs of media content items by determining desirable locations in which transitions across the pairs of media content items occur. The system uses a plurality of track features of media content items and determines such track features of each media content item associated with each of transition point candidates, such as beat positions, of that media content item. The system determines similarity in the plurality of track features between the transition point candidates of a first media content item and the transition point candidates for a second media content item being played subsequent to the first media content item. The transition points or portions of the first and second media content items are selected from the transition point candidates for the first and second media content items based on the similarity results.

20 Claims, 21 Drawing Sheets

Related U.S. Application Data

(60) Provisional application No. 62/313,636, filed on Mar. 25, 2016.

(51) Int. Cl.
*G06F 16/635* (2019.01)
*H04L 65/612* (2022.01)
*G10H 1/00* (2006.01)

(52) U.S. Cl.
CPC ... *G10H 2210/00* (2013.01); *G10H 2210/571* (2013.01); *G10H 2220/321* (2013.01); *G10H 2220/395* (2013.01); *G10H 2240/075* (2013.01); *G10H 2240/131* (2013.01); *H04L 65/612* (2022.05)

(58) Field of Classification Search
CPC .......... G11B 27/038; H04N 21/23418; H04N 21/23424; G06F 17/30053; G06F 17/30743; G06F 17/30761; G06F 17/30772; G06F 3/165
See application file for complete search history.

(56) References Cited

U.S. PATENT DOCUMENTS

| | | | | |
|---|---|---|---|---|
| 8,280,539 | B2* | 10/2012 | Jehan | G11B 27/038 84/610 |
| 9,578,279 | B1* | 2/2017 | Mysore Vijaya Kumar | G06V 20/40 |
| 10,803,118 | B2 | 10/2020 | Jehan | |
| 2003/0050058 | A1 | 3/2003 | Walsh | |
| 2003/0221541 | A1* | 12/2003 | Platt | G06F 16/48 707/E17.009 |
| 2008/0249644 | A1* | 10/2008 | Jehan | G11B 27/322 |
| 2010/0070917 | A1* | 3/2010 | Gates | G06F 16/68 715/810 |
| 2010/0153469 | A1 | 6/2010 | Mckinney et al. | |
| 2010/0332437 | A1 | 12/2010 | Samadani | |
| 2012/0023403 | A1 | 1/2012 | Herberger | |
| 2012/0150698 | A1* | 6/2012 | McClements, IV | G11B 27/034 705/27.2 |
| 2016/0292272 | A1 | 10/2016 | O'Driscoll et al. | |
| 2017/0300567 | A1 | 10/2017 | Jehan | |

OTHER PUBLICATIONS

Allan, Patrick, "Seven Tips to Build a Better Party Playlist", Nov. 29, 2016, lifehacker.com, https://lifehacker.com/seven-tips-to-build-a-better-party-playlist-1789444085, 13 pgs.

Cunninham et al., 'More of an Art than a Science': Supporting the Creation of Playlists and Mixes, Oct. 1, 2006, In Proceedings: Seventh International Conference on Music Information Retrieval, 6 pages.

Herremans, Dorien, et al.,"Dance Hit Song Prediction", Feb. 12, 2014, ANT/OR, Univ. of Antwerp Operations Research Group, http://www.dorienherremans.com/sites/default/files/wp_hit.pdf, 23 pgs.

Neal, Meghan, "A Machine Successfully Predicted the Hiut Dance Songs of 2015", Dec. 17, 2015, vice.com, https://www.vice.com/en/article/bmvxvm/a-machine-successfully-predicted-the-hit-dance-songs-of-2015, 10 pgs.

PCT International Search Report and Written Opinion from corresponding International Patent Application No. PCT/US2017/024106, dated Jul. 4, 2017, 14 pages.

Schnell et al., "8 Tips for Making the Perfect Party Playlist", Nov. 12, 2013, [captured by archive.org on Dec. 1, 2016], Mpls. St. Pls Magazine, https://web.archive.org/web/20161201144027/https://mspmag.com/arts-and-culture/8-tips-for-making-party-playlists/, 6 pgs.

PCT International Preliminary Report on Patentability in Application No. PCT/US2017/024106, dated Oct. 4, 2018, 9 pages.

PCT International Preliminary Report on Patentability in Application No. PCT/US2017/024109, dated Oct. 4, 2018, 9 pages.

European Communication in Application 17717949.6, dated Sep. 21, 2020, 5 pages.

European Communication in Application 17717949.6, dated Jul. 12, 2021, 6 pages.

Ragnhild Torvanger Solberg and Nicola Dibben "Peak Experiences With Electronic Dance Music: Subjective Experiences, Physiological Responses, and Musical Characteristics of the Break Routine", Music Perception, vol. 36, Iss. 4, pp. 371-389.

Cinnamon Nippard "The Science Behind the Drop", Djbroadcast, Jun. 15, 2015. Available Online at: https://www.djbroadcast.net/article/122774/the-science-behind-the-drop.

Anonymous: "Spotify launches beat-matching Party mode with a new mix from Diplo—The Verge", Dec. 16, 2015 (Dec. 16, 2015), XP055382305, Retrieved from the Internet: URL: https://www.theverge.com/2015/12/16/10287540/spotify-launches-beat-matching-party-mode-with-a-new-mix-from-diplo [retrieved on Jun. 16, 2017].

International Search Report and Written Opinion from corresponding International Patent Application No. PCT/US2017/024109, dated Jun. 26, 2017, 16 pages.

Dieleman, S.: "Recommending music on Spotify with deep learning", published Aug. 5, 2014. Retrieved Mar. 21, 2017. Available online at: http://benanne.github.io/2014/08/05/spotify-cnns.html.

Lamere, P.: "The Drop Machine", Music Machinery, published Jun. 16, 2015. Retrieved Mar. 21, 2017. Available online at: https://musicmachinery.com/2015/06/16/the-drop-machine/.

Yadati, K. et al.: "Detecting Drops in Electronic Dance Music: Content Based Approaches To a Socially Significant Music Event", 15th International Society for Music Information Retrieval Conference (ISMIR 2014), Oct. 27-31, 2014, Taipei, Taiwan, pp. 143-148.

Van den Oord, A. et al.: "Deep content-based music recommendation", Advances in neural information processing systems, 2013, pp. 2643-2651.

McFee, B. and Ellis, D. P.W.: "Analyzing Song Structure With Spectral Clustering", 15th International Society for Music Information Retrieval Conference (ISMIR 2014), Oct. 27-31, 2014, Taipei, Taiwan, pp. 405-410.

Lin, S. and Kemighan, B. W.: "An Effective Heuristic Algorithm for the Traveling-Salesman Problem", Operations Research, vol. 21, No. 2, Mar.-Apr. 1973, pp. 498-516.

Kell, T. and Tzanetakis, G.: "Empirical Analysis of Track Selection and Ordering in Electronic Dance Music Using Audio Feature Extraction", International Conference on Music Information Retrieval (ISMIR), Nov. 4-8, 2013, Curitiba ,Brazil, 6 pages.

Jehan, Tristan: "Creating Music by Listening", Diss. Massachusetts Institute of Technology, School of Architecture and Planning, Program in Media Arts and Sciences, 2005.

Ishizaki, H. et al.: "Full-Automatic DJ Mixing System With Optimal Tempo Adjustment Based On Measurement Function of User Discomfort", 10th International Society for Music Information Retrieval Conference (ISMIR), Oct. 2009, pp. 135-140.

Hirai, T. et al.: "MusicMixer: Computer-Aided DJ system based on an automatic song mixing", Proceedings of the 12th International Conference on Advances in Computer Entertainment Technology. ACM, 2015.

Flexer, A. et al.: "Playlist Generation Using Start and End Songs", International Conference on Music Infomnation Retrieval (ISMIR), Session 2a—Music Recommendation and Organization, 2008, pp. 173-178.

Cliff, Dave: "Hang the DJ: Automatic sequencing and seamless mixing of dance-music tracks." HP Laboratories Technical Report HPL 104 (2000), 11 pages.

Bello, J. P. et al.: "A tutorial on onset detection in music signals", IEEE Transactions on speech and audio processing, vol. 13, No. 5, 2005, pp. 1035-1047.

\* cited by examiner

TRANSITIONS BETWEEN MEDIA CONTENT ITEMS

CROSS-REFERENCE TO RELATED APPLICATIONS

This application is a Continuation of U.S. application Ser. No. 15/469,048 filed on Mar. 24, 2017 and titled TRANSITIONS BETWEEN MEDIA CONTENT ITEMS, which claims priority to U.S. Application No. 62/313,636 filed on Mar. 25, 2016 and titled SYSTEM AND METHOD FOR AUTOMATIC AND SCALABLE PLAYLIST SEQUENCING AND TRANSITIONS, the disclosures of which are hereby incorporated by reference in their entireties.

BACKGROUND

Many activities including daily, recreation, or fitness activities include repetitive motions. For example, running and walking involve repetitive steps, biking involves repetitive rotational movements, rowing involves repetitive strokes, and swimming involves repetitive strokes and kicks. There are of course many other activities that also include various repetitive motions. These repetitive motion activities may be performed in place (e.g., using a treadmill, stationary bike, rowing machine, swimming machine, etc.) or in motion (e.g., on roads, trails, or tracks or in a pool or body of water, etc.). Cadence refers to the frequency of these repetitive motions and is often measured in terms of motions per minute (e.g., steps per minute, rotations per minute, strokes per minute, or kicks per minute).

Many people enjoy consuming media content, such as listening to audio content or watching video content, while running or engaging in other repetitive-motion activities. Examples of audio content include songs, albums, podcasts, audiobooks, etc. Examples of video content include movies, music videos, television episodes, etc. Using a mobile phone or other media playback device a person can access large catalogs of media content. For example, a user can access an almost limitless catalog of media content through various free and subscription-based streaming services. Additionally, a user can store a large catalog of media content on his or her mobile device.

This nearly limitless access to media content introduces new challenges for users. For example, it may be difficult to find or select the right media content that complements a particular moment during a run or other repetitive-motion activity. Further, it is desirable to play a series of media content items to create engaging, seamless, and cohesive listening experiences, which could be provided by professional music curators and DJs who carefully sort and mix tracks together. Average listeners typically lack the time and skill required to craft such an experience for their own personal enjoyment.

SUMMARY

In general terms, this disclosure is directed to systems and methods for managing transitions between media content items. In one possible configuration and by non-limiting example, the systems and methods use a plurality of track features of media content items and determine such track features of each media content item associated with each of transition point candidates, such as beat positions, of that media content item. Various aspects are described in this disclosure, which include, but are not limited to, the following aspects.

One aspect is a method of playing back media content items. The method comprising: determining first transition point candidates for a first media content item and second transition point candidates for a second media content item; obtaining one or more first media content item features associated with each of the first transition point candidates and one or more second media content item features associated with each of the second transition point candidates, the one or more first media content item features corresponding to the one or more second media content item features, respectively; determining a first aggregated feature for the one or more first media content item features associated with each of the first transition point candidates and a second aggregated feature for the one or more second media content item features associated with each of the second transition point candidates; for each pair of the first transition point candidates and the second transition point candidates, determining a similarity score between the first aggregated feature and the second aggregated feature; determining a pair of a first transition point and a second transition point, the first transition point selected from the first transition point candidates and the second transition point selected from the second transition point candidates, the pair of the first transition point and the second transition point corresponding to a similarity score meeting a threshold; and rendering a transition between the first media content item and the second media content item by matching the first transition point and the second transition point.

Another aspect is a method of playing back media content items with transitions. The method comprising: determining first transition point candidates for a first media content item, the first transition point candidates corresponding to beat positions in time of the first media content item; determining second transition point candidates for a second media content item, the second transition point candidates corresponding to beat positions in time of the second media content item; obtaining a plurality of first media content item features for each of the first transition point candidates; obtaining a plurality of second media content item features for each of the second transition point candidates, the plurality of second media content item features corresponding to the plurality of first media content item features; calculating a plurality of transition cost matrices, each of the plurality of transition cost matrices being representative of similarity between one of the plurality of first media content item features and a corresponding one of the plurality of corresponding second media content item features for each pair of the first transition point candidates and the second transition point candidates; calculating a combined transition cost matrix by aggregating the plurality of transition cost matrices; determining a first transition point and a second transition point based on the combined transition cost matrix, the first transition point selected from the first transition point candidates and the second transition point selected from the second transition point candidates, a pair of the first transition point and the second transition point being associated with a matrix element in the combined transition cost matrix; the matrix element meeting a threshold; and rendering a transition between the first media content item and the second media content item based on the pair of the first transition point and the second transition point.

Yet another aspect is a computer readable storage device storing data instructions which, when executed by a processing device, cause the processing device to: determine first transition point candidates for a first media content item and second transition point candidates for a second media content item; obtain one or more first media content item features associated with each of the first transition point candidates and one or more second media content item features associated with each of the second transition point candidates, the one or more first media content item features corresponding to the one or more second media content item features, respectively; determine a first aggregated feature for the one or more first media content item features associated with each of the first transition point candidates and a second aggregated feature for the one or more second media content item features associated with each of the second transition point candidates; for each pair of the first transition point candidates and the second transition point candidates, determine a similarity score between the first aggregated feature and the second aggregated feature; determine a pair of a first transition point and a second transition point, the first transition point selected from the first transition point candidates and the second transition point selected from the second transition point candidates, the pair of the first transition point and the second transition point corresponding to a similarity score meeting a threshold; and render a transition between the first media content item and the second media content item by matching the first transition point and the second transition point.

A further aspect is a system comprising: at least one processing device; and at least one computer readable storage device, storing data instructions which, when executed by the at least one processing device, cause the processing device to: determine first transition point candidates for a first media content item and second transition point candidates for a second media content item; obtain one or more first media content item features associated with each of the first transition point candidates and one or more second media content item features associated with each of the second transition point candidates, the one or more first media content item features corresponding to the one or more second media content item features, respectively; determine a first aggregated feature for the one or more first media content item features associated with each of the first transition point candidates and a second aggregated feature for the one or more second media content item features associated with each of the second transition point candidates; for each pair of the first transition point candidates and the second transition point candidates, determine a similarity score between the first aggregated feature and the second aggregated feature; determine a pair of a first transition point and a second transition point, the first transition point selected from the first transition point candidates and the second transition point selected from the second transition point candidates, the pair of the first transition point and the second transition point corresponding to a similarity score meeting a threshold; and render a transition between the first media content item and the second media content item by matching the first transition point and the second transition point.

DETAILED DESCRIPTION

Figure 1:
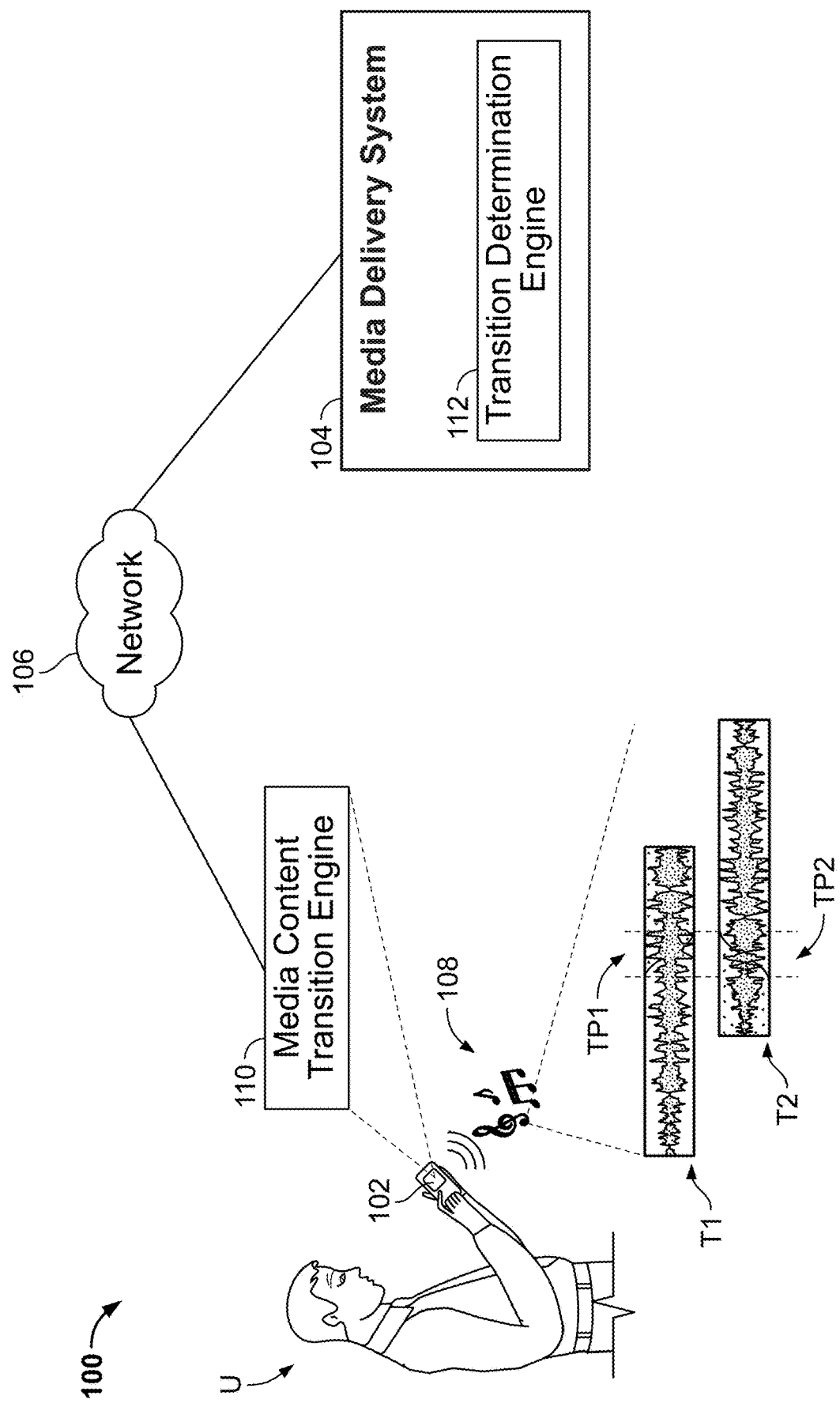
FIG. 1 illustrates an example system for playing media content items with a transition between media content items.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

In general, the system of the present disclosure determines transitions between pairs of media content items by determining desirable locations in which transitions across tracks occur. The system can further choose types of transitions. In certain examples, the system uses a plurality of track features (also referred to herein as media content item features) of media content items and determines such track features of each media content item associated with each of transition point candidates, such as beat positions, of that media content item. At least some of the track features are calculated as track features at each transition point candidate or over a duration including that transition point candidate. The system operates to determine similarity in the plurality of track features between a transition point candidate of a first media content item and a transition point candidate for a second media content item being played subsequent to the first media content item. The transition points or portions of the first and second media content items are selected from the transition point candidates for the first and second media content items based on the similarity.

In certain examples, the system of the present disclosure is used to play back a plurality of media content items to continuously support a user's repetitive motion activity without distracting the user's cadence.

As such, the system provides a simple, efficient solution to transitions between media content items with professional-level quality. The system of the present disclosure enables transitions to occur at downbeats. Further, according to the present disclosure, the transitions can be heavily weighted to occur on section boundaries. Moreover, the smooth transition can occur at regions of tracks having similar timbre and pitch distributions. In certain examples, the management process for transitions between media content items is executed in a server computing device, rather than the media playback device. Accordingly, the media playback device can save its resources for playing back media content items with such transitions, and the management process can be efficiently maintained and conveniently modified as appropriate without interacting with the media playback device.

FIG. 1 illustrates an example system 100 for playing media content items with a transition between adjacent media content items. In this example, the system 100 includes a media playback device 102 and a media delivery system 104. The system 100 communicates across a network 106. In some embodiments, a media content transition engine 110 runs on the media playback device 102, and a transition determination engine 112 runs on the media delivery system 104. Also shown is a user U who uses the media playback device 102 to continuously play back a plurality of media content items including a first media content item T1 and a second media content item T2.

The media playback device 102 operates to play media content items to produce media output 108. In some embodiments, the media content items are provided by the media delivery system 104 and transmitted to the media playback device 102 using the network 106. A media content item is an item of media content, including audio, video, or other types of media content, which may be stored in any format suitable for storing media content. Non-limiting examples of media content items include songs, albums, music videos, movies, television episodes, podcasts, other types of audio or video content, and portions or combinations thereof. In this document, the media content items can also be referred to as tracks.

The media delivery system 104 operates to provide media content items to the media playback device 102. In some embodiments, the media delivery system 104 are connectable to a plurality of media playback devices 102 and provide media content items to the media playback devices 102 independently or simultaneously.

The media content transition engine 110 operates to make transitions between media content items which are played on the media playback device 102. Where a first media content item (or a first track) T1 and a second media content item (or a second track) T2 are played sequentially, the media content transition engine 110 is configured to overlap at least a portion of the first content item T1 and at least a portion of the second media content item T2 to create interesting DJ-like transition effects. In some embodiments, two media content items T1, T2 are aligned and overlapped with a transition portion determined by the transition determination engine 112 of the media delivery system 104.

Figure 22:
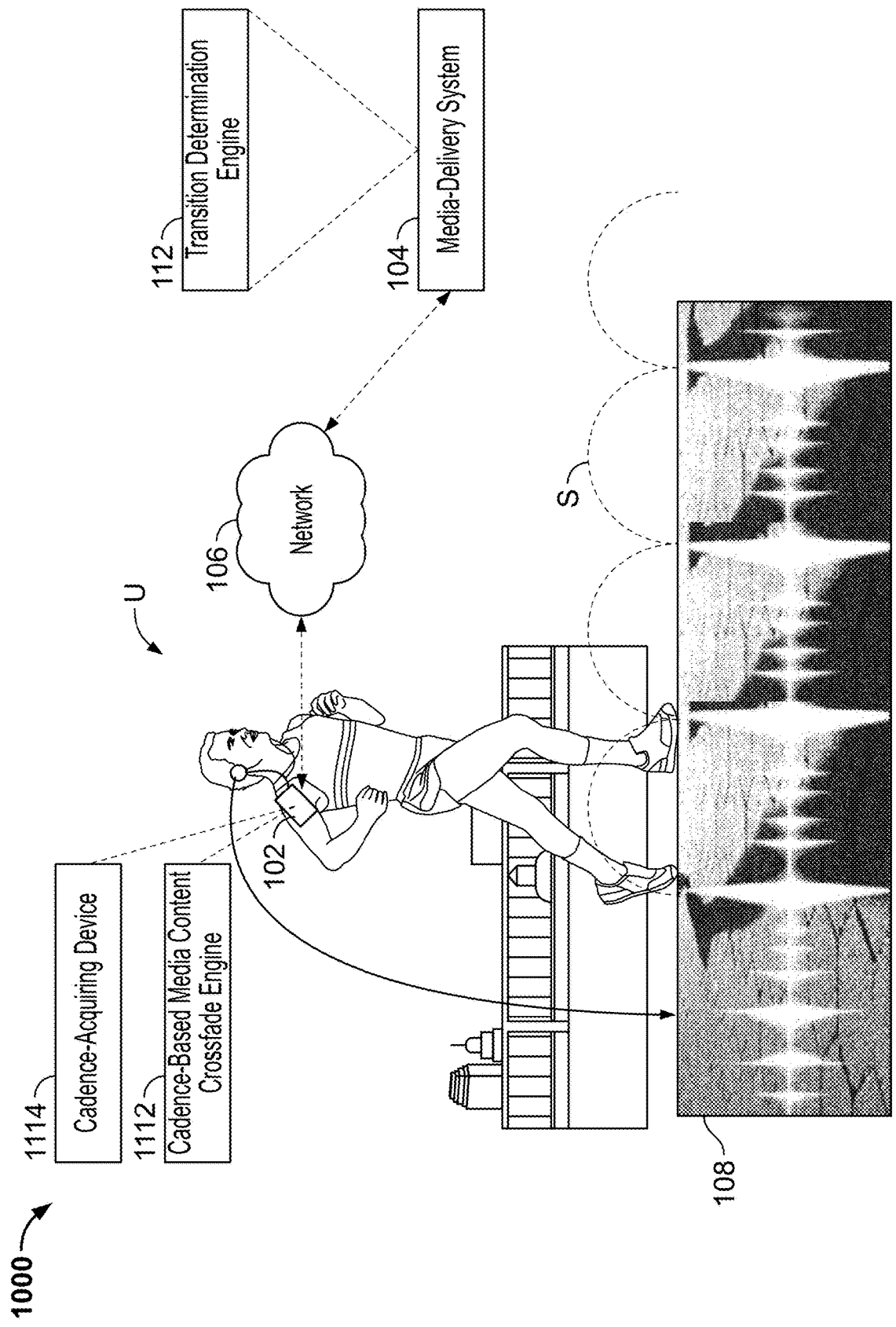
FIG. 22 illustrates an example system for managing transitions between media content items to continuously support a repetitive motion activity.
Figure 23:
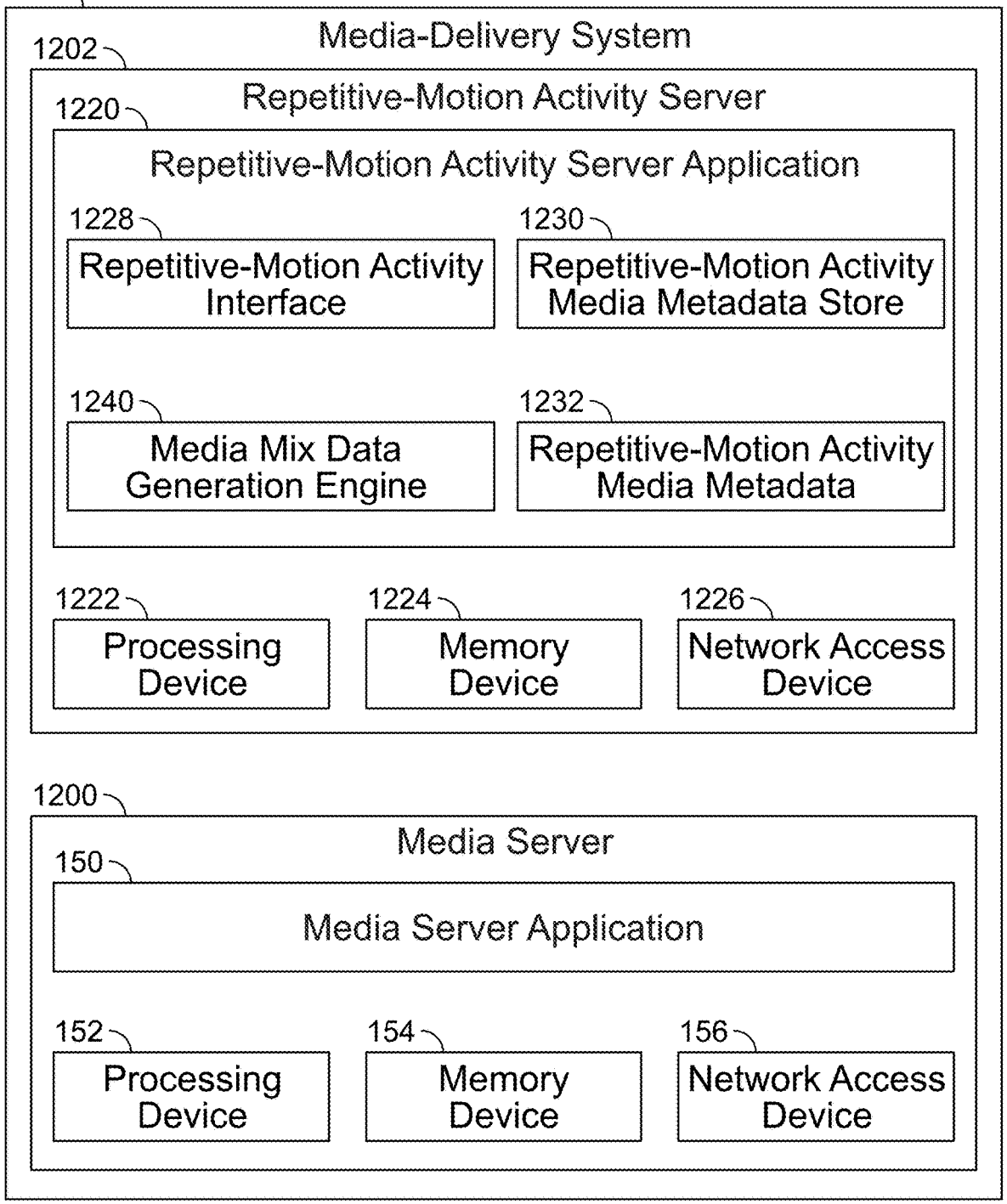
FIG. 23 illustrates an example media delivery system of FIG. 22 for managing transitions between media content items to continuously support a repetitive motion activity.

In some embodiments, as illustrated in FIGS. 22 and 23, the system 100 operates to play media content items with transitions designed to continuously support the user's repetitive motion activity without interruption.

The transition determination engine 112 operates to determine transition portions of media content items which are played continuously. For example, when the first track T1 and the second track T2 are played by the media playback device 102, the transition determination engine 112 can operate to determine a transition portion TP1 of the first track T1 and a transition portion TP2 of the second track T2, which are to be overlapped as the first track T1 and the second track T2 are played back in order.

Figure 2:
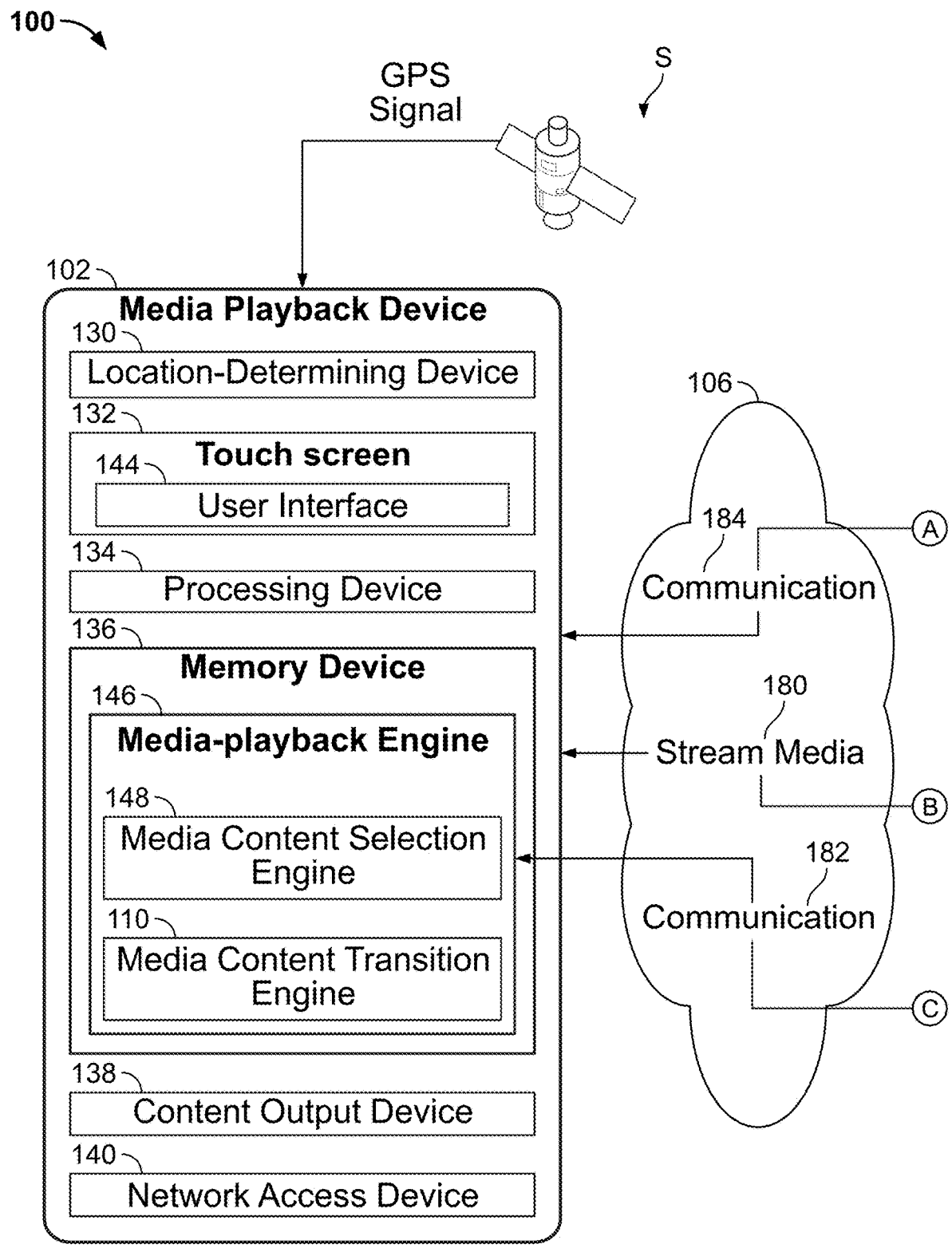
FIG. 2 is a schematic illustration of an example system for playing media content items with a transition between media content items.
Figure 2:
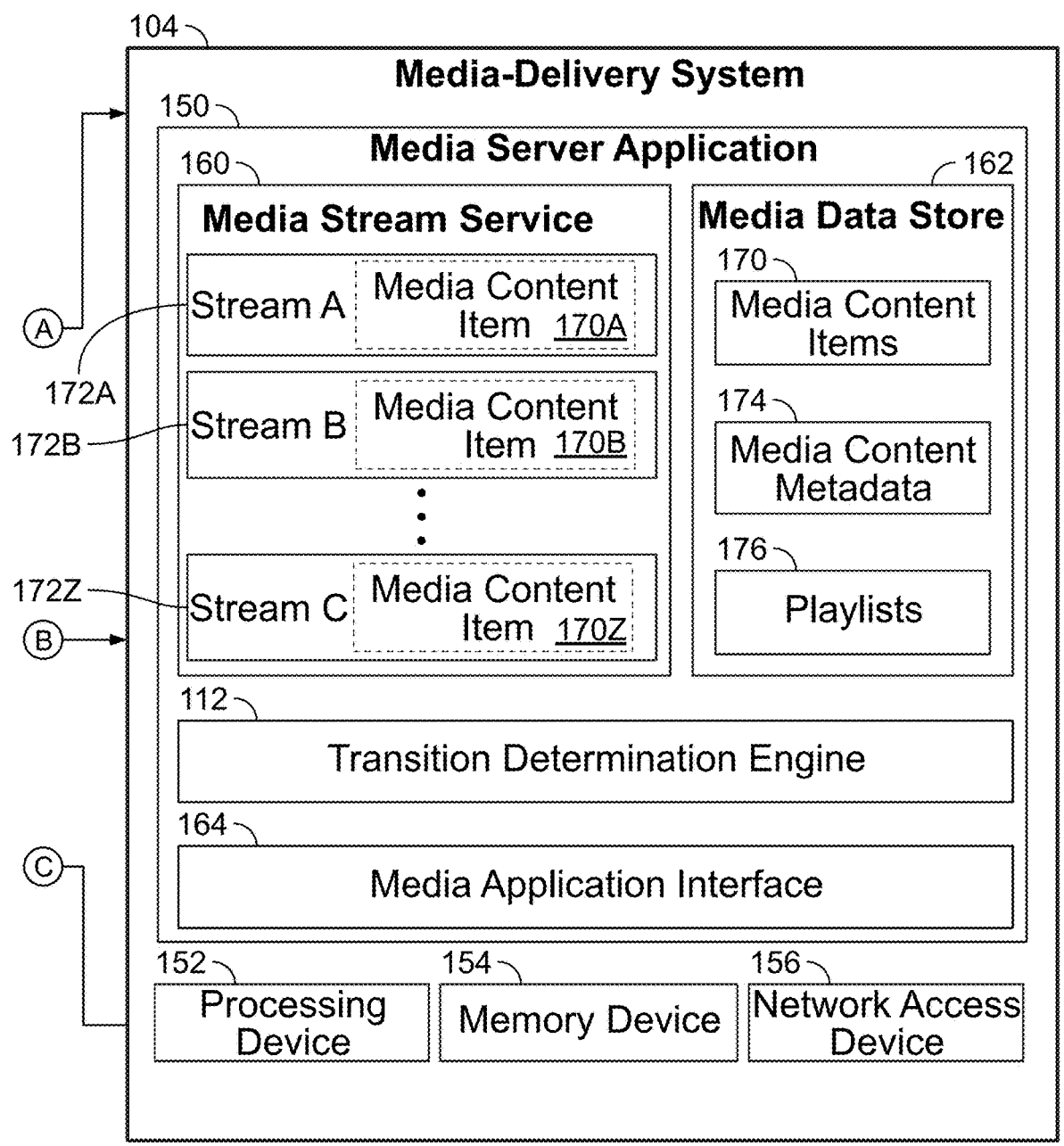

FIG. 2 is a schematic illustration of an example system 100 for playing media content items with a transition between adjacent media content items. As also illustrated in FIG. 1, the system 100 can include the media playback device 102, the media delivery system 104, and the network 106.

As described herein, the media playback device 102 operates to play media content items. In some embodiments, the media playback device 102 operates to play media content items that are provided (e.g., streamed, transmitted, etc.) by a system external to the media playback device such as the media delivery system 104, another system, or a peer device. Alternatively, in some embodiments, the media playback device 102 operates to play media content items stored locally on the media playback device 102. Further, in at least some embodiments, the media playback device 102 operates to play media content items that are stored locally as well as media content items provided by other systems.

In some embodiments, the media playback device 102 is a computing device, handheld entertainment device, smartphone, tablet, watch, wearable device, or any other type of device capable of playing media content. In yet other embodiments, the media playback device 102 is a laptop computer, desktop computer, television, gaming console, set-top box, network appliance, blue-ray or DVD player, media player, stereo, or radio.

In at least some embodiments, the media playback device 102 includes a location-determining device 130, a touch screen 132, a processing device 134, a memory device 136, a content output device 138, and a network access device 140. Other embodiments may include additional, different, or fewer components. For example, some embodiments may include a recording device such as a microphone or camera that operates to record audio or video content. As another example, some embodiments do not include one or more of the location-determining device 130 and the touch screen 132.

The location-determining device 130 is a device that determines the location of the media playback device 102. In some embodiments, the location-determining device 130 uses one or more of the following technologies: Global Positioning System (GPS) technology which may receive GPS signals from satellites S, cellular triangulation technology, network-based location identification technology, Wi-Fi positioning systems technology, and combinations thereof.

The touch screen 132 operates to receive an input from a selector (e.g., a finger, stylus etc.) controlled by the user U. In some embodiments, the touch screen 132 operates as both a display device and a user input device. In some embodiments, the touch screen 132 detects inputs based on one or both of touches and near-touches. In some embodiments, the touch screen 132 displays a user interface 144 for interacting with the media playback device 102. As noted above, some embodiments do not include a touch screen 132. Some embodiments include a display device and one or more separate user interface devices. Further, some embodiments do not include a display device.

In some embodiments, the processing device 134 comprises one or more central processing units (CPU). In other embodiments, the processing device 134 additionally or alternatively includes one or more digital signal processors, field-programmable gate arrays, or other electronic circuits.

The memory device 136 operates to store data and instructions. In some embodiments, the memory device 136 stores instructions for a media playback engine 146 that includes a media content selection engine 148 and the media content transition engine 110.

The memory device 136 typically includes at least some form of computer-readable media. Computer readable media include any available media that can be accessed by the media playback device 102. By way of example, computer-readable media include computer readable storage media and computer readable communication media.

Computer readable storage media includes volatile and nonvolatile, removable and non-removable media implemented in any device configured to store information such as computer readable instructions, data structures, program modules, or other data. Computer readable storage media includes, but is not limited to, random access memory, read only memory, electrically erasable programmable read only memory, flash memory and other memory technology, compact disc read only memory, blue ray discs, digital versatile discs or other optical storage, magnetic cassettes, magnetic tape, magnetic disk storage or other magnetic storage devices, or any other medium that can be used to store the desired information and that can be accessed by the media playback device 102. In some embodiments, computer readable storage media is non-transitory computer readable storage media.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The content output device 138 operates to output media content. In some embodiments, the content output device 138 generates media output 108 (FIG. 1) for the user U. Examples of the content output device 138 include a speaker, an audio output jack, a Bluetooth transmitter, a display panel, and a video output jack. Other embodiments are possible as well. For example, the content output device 138 may transmit a signal through the audio output jack or Bluetooth transmitter that can be used to reproduce an audio signal by a connected or paired device such as headphones or a speaker.

The network access device 140 operates to communicate with other computing devices over one or more networks, such as the network 106. Examples of the network access device include wired network interfaces and wireless network interfaces. Wireless network interfaces includes infrared, BLUETOOTH® wireless technology, 802.11a/b/g/n/ac, and cellular or other radio frequency interfaces in at least some possible embodiments.

The media playback engine 146 operates to play back one or more of the media content items (e.g., music) to the user U. When the user U is running while using the media playback device 102, the media playback engine 146 can operate to play media content items to encourage the running of the user U, as illustrated with respect to FIG. 22. As described herein, the media playback engine 146 is configured to communicate with the media delivery system 104 to receive one or more media content items (e.g., through the stream media 180), as well as transition data generated by the media delivery system 104 for aligning and overlapping media content items when played. Alternatively, such transition data can be locally generated by, for example, the media playback device 102.

The media content selection engine 148 operates to retrieve one or more media content items. In some embodiments, the media content selection engine 148 is configured to send a request to the media delivery system 104 for media content items and receive information about such media content items for playback. In some embodiments, media content items can be stored in the media delivery system 104. In other embodiments, media content items can be stored locally in the media playback device 102. In yet other embodiments, some media content items can be stored locally in the media playback device 102 and other media content items can be stored in the media delivery system 104.

The media content transition engine 110 is included in the media playback engine 146 in some embodiments. The media content transition engine 110 operates to make smooth changeover between media content items, thereby creating an enhanced level of transitioning quality across media content items which would otherwise be manually performed by music professionals, such as disc jockeys. As described herein, such a transition between media content items can also support a user's repetitive motion activity.

With still reference to FIG. 2, the media delivery system 104 includes one or more computing devices and operates to provide media content items to the media playback devices 102 and, in some embodiments, other media playback devices as well. In some embodiments, the media delivery system 104 operates to transmit stream media 180 to media playback devices such as the media playback device 102.

In some embodiments, the media delivery system 104 includes a media server application 150, a processing device 152, a memory device 154, and a network access device 156. The processing device 152, memory device 154, and network access device 156 may be similar to the processing device 134, memory device 136, and network access device 140 respectively, which have each been previously described.

In some embodiments, the media server application 150 operates to stream music or other audio, video, or other forms of media content. The media server application 150 includes a media stream service 160, a media data store 162, and a media application interface 164.

The media stream service 160 operates to buffer media content such as media content items 170 (including 170A, 170B, and 170Z) for streaming to one or more streams 172A, 172B, and 172Z.

The media application interface 164 can receive requests or other communication from media playback devices or other systems, to retrieve media content items from the media delivery system 104. For example, in FIG. 2, the media application interface 164 receives communication 182 from the media playback engine 146.

In some embodiments, the media data store 162 stores media content items 170, media content metadata 174, and playlists 176. The media data store 162 may comprise one or more databases and file systems. Other embodiments are possible as well. As noted above, the media content items 170 may be audio, video, or any other type of media content, which may be stored in any format for storing media content.

The media content metadata 174 operates to provide various pieces of information associated with the media content items 170. In some embodiments, the media content metadata 174 includes one or more of title, artist name, album name, length, genre, mood, era, etc. In addition, the media content metadata 174 includes acoustic metadata which may be derived from analysis of the track. Acoustic metadata may include temporal information such as tempo, rhythm, beats, downbeats, tatums, patterns, sections, or other structures. Acoustic metadata may also include spectral information such as melody, pitch, harmony, timbre, chroma, loudness, vocalness, or other possible features. Examples of acoustic metadata are further described herein.

The playlists 176 operate to identify one or more of the media content items 170. In some embodiments, the playlists 176 identify a group of the media content items 170 in a particular order. In other embodiments, the playlists 176 merely identify a group of the media content items 170 without specifying a particular order. Some, but not necessarily all, of the media content items 170 included in a particular one of the playlists 176 are associated with a common characteristic such as a common genre, mood, or era.

Referring still to FIG. 2, the network 106 is an electronic communication network that facilitates communication between the media playback device 102 and the media delivery system 104. An electronic communication network includes a set of computing devices and links between the computing devices. The computing devices in the network use the links to enable communication among the computing devices in the network. The network 106 can include routers, switches, mobile access points, bridges, hubs, intrusion detection devices, storage devices, standalone server devices, blade server devices, sensors, desktop computers, firewall devices, laptop computers, handheld computers, mobile telephones, and other types of computing devices.

In various embodiments, the network 106 includes various types of links. For example, the network 106 can include wired and/or wireless links, including Bluetooth, ultra-wideband (UWB), 802.11, ZigBee, cellular, and other types of wireless links. Furthermore, in various embodiments, the network 106 is implemented at various scales. For example, the network 106 can be implemented as one or more local area networks (LANs), metropolitan area networks, subnets, wide area networks (such as the Internet), or can be implemented at another scale. Further, in some embodiments, the network 106 includes multiple networks, which may be of the same type or of multiple different types.

Although FIG. 2 illustrates only a single media playback device 102 communicable with a single media delivery system 104, in accordance with some embodiments, the media delivery system 104 can support the simultaneous use of multiple media playback devices, and the media playback device can simultaneously access media content from multiple media delivery systems. Additionally, although FIG. 2 illustrates a streaming media based system for managing transitions between media content items, other embodiments are possible as well. For example, in some embodiments, the media playback device 102 includes a media data store 162 and the media playback device 102 is configured to perform management of transitions between media content items without accessing the media delivery system 104. Further in some embodiments, the media playback device 102 operates to store previously streamed media content items in a local media data store.

Figure 3:
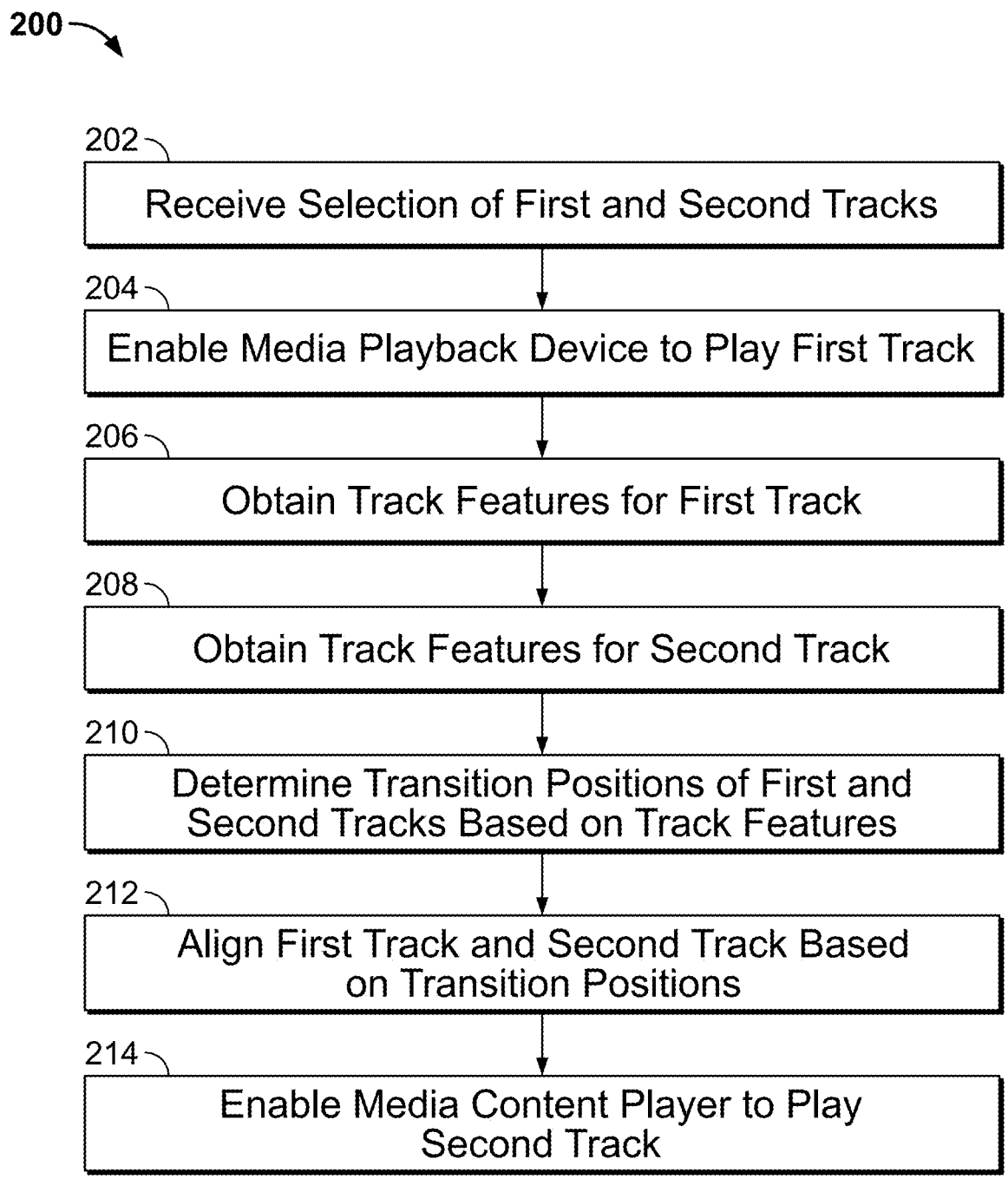
FIG. 3 illustrates an example method for automatically transitioning from playback of a first media content item and playback of a second media content item.

FIG. 3 illustrates an example method 200 for automatically transitioning from playback of a first media content item (also referred to herein as a first track) T1 and playback of a second media content item (also referred to herein as a second track) T2. The method 220 is described herein with further reference to FIG. 4, which illustrates the first media content item T1 and the second media content item T2.

In this example, the method 200 is described as being performed in the media delivery system 104 including the transition determination engine 112. However, in other embodiments, only some of the processes in the method 200 can be performed by the media delivery system 104. In other embodiments, all or some of the processes in the method 200 are performed by the media playback device 102. In yet other embodiments, all or some of the processes in the method 200 are performed by both of the media delivery system 104 and the media playback device 102 in cooperation.

In this document, the term "transition" or "transitioning" can be interchangeably used with the term "segue" or "seguing." When found on a musical score, the term "segue" instructs the performer to continue the next section of the musical composition without a pause. In recorded music or in live performance, "segue" commonly means a seamless transition between one song and another. Within this description, "segue" means a gradual and seamless transition between two recorded audio tracks, such as the "mixing" performed by a DJ in a nightclub.

Further, within this description, the terms "automatically" and "automated" mean "without user intervention". An automated task may be initiated by a user but an automated task, once initiated, proceeds to a conclusion without further user action.

Within this description, a "track" is a digital data file containing audio information. A track may be stored on a storage device such as a hard disc drive, and may be a component of a library of audio tracks. A track may be a recording of a song or a section, such as a movement, of a longer musical composition. A track may be stored in any known or future audio file format. A track may be stored in an uncompressed format, such as a WAV file, or a compressed format such as an MP3 file. In this document, however, a track is not limited to be of audio type and it is also understood that a track can indicate a media content item of any suitable type.

Although the method 200 is illustrated with the first track T1 and the second track T2, it is understood that the method 200 may be continuous in nature, in that the same processes may be used to segue from the second track to a third track and then to a fourth track and so on until a sequence, or play list, of tracks has been played.

Referring still to FIG. 3, at operation 202, the media delivery system 104 receives selection of a first track T1 and a second track T2. The selection of the first track T1 and the second track T2 can be made by a user, may be random, or may be the result of an automated search of a library of recorded audio tracks. The first track can be retrieved from a storage device (such as the media data store 162 in FIG. 2) which may store a library including a large plurality of recorded tracks.

In some embodiments, to allow a transition from the first track to the second track for particular purposes (such as smooth or pleasing transition), the second track T2 may be selected to be similar, in at least some aspects, to the first track T1. The second track may be selected by the user, or may be selected automatically. For example, the second track may be selected as the result of an automated search of the library of recorded tracks specifically for tracks that are similar in sound, style, genre, or other characteristic to the first track. Various automated searching approaches can be used including any known or future processes for comparing media content items.

At operation 204, the media delivery system 104 enables the media playback device 102 to play the first track T1. In some embodiments, the media delivery system 104 receives a request from the media playback device 102 to retrieve the first track T1 and streams the first track T1 to the media playback device 102. In other embodiments, the media playback device 102 first downloads the first track T1 from the media delivery system 104 and play the first track T1. In yet other embodiments, the media playback device 102 stores the first track T1 and plays it locally.

At operations 206 and 208, the media delivery system 104 obtains track features 230 (FIG. 5) for the first track T1 and track features 230 for the second track T2. For clarity, the track features 230 of the first track T1 and the second track T2 can also be referred to herein as first track features 230A and second track features 230B, respectively. Track features 230 represent various characteristics of a media content item in various forms. Such track features 230 are described with reference to FIG. 5.

In some embodiments, the track features 230 include acoustic features or metadata. Such acoustic features can refer to a numerical or mathematical representation of the sound of a track. Some forms of acoustic features may be referred to as an acoustic fingerprint of a track. Acoustic metadata may be derived from analysis of the track. Acoustic metadata may include temporal information such as tempo, rhythm, beats, downbeats, tatums, patterns, sections, or other structures. Acoustic metadata may also include spectral information such as melody, pitch, harmony, timbre, chroma, loudness, vocalness, or other possible features. For the purpose of automatically segueing from the first track to the second track, the acoustic metadata obtained at operations 206 and 208 may divide each track into time slices or segments and provide temporal and/or spectral information for each segment. Further, the acoustic metadata obtained at operations at 206 and 208 may provide temporal and/or spectral information during a period of time or over a range of segments. The acoustic metadata may be in the form of one or more tables, vectors, matrices, and combinations thereof. Acoustic metadata may be stored on a storage device, which may be the same or different from the storage device storing tracks.

In some embodiments, acoustic metadata differs from explicit metadata, such as track title, artists, lyrics, and other factual information related to a recorded track. Acoustic metadata also differs from cultural metadata such as genre, style, mood, quality, and other qualitative information such as descriptive terms and tags related to a recorded track.

Figure 7:
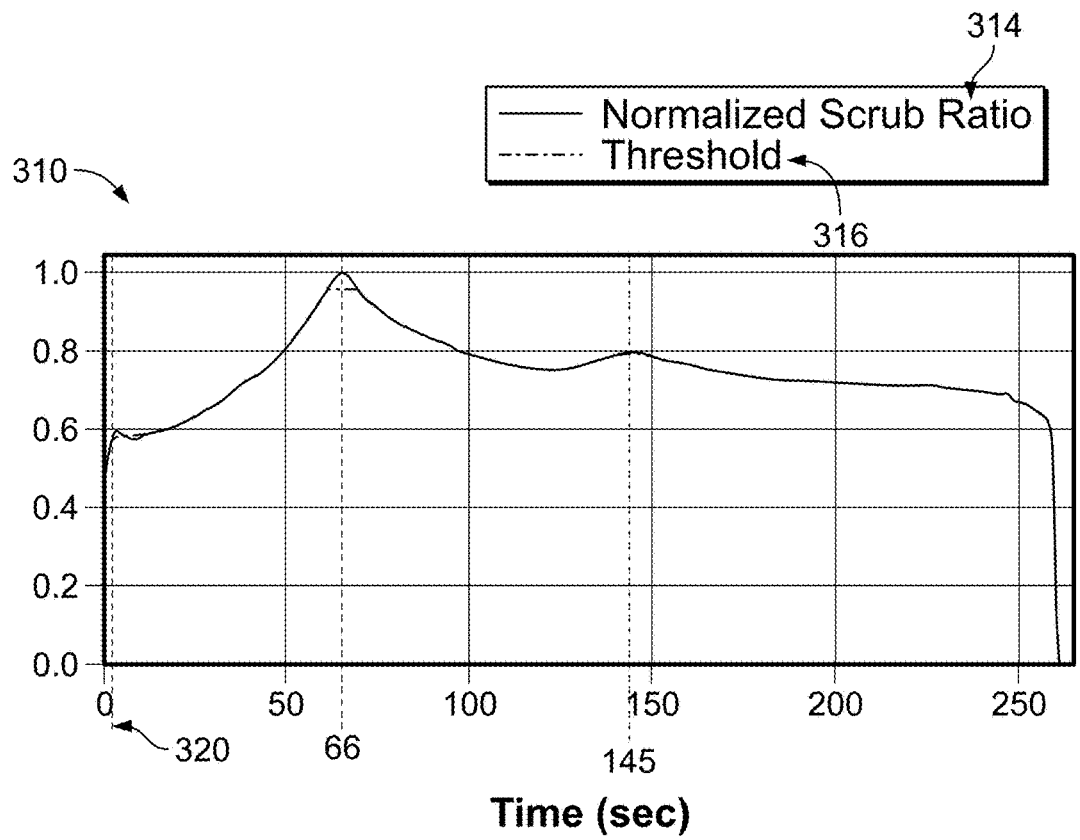
FIG. 7 illustrates an example of playhead scrubbing data for a musical track.
Figure 8:
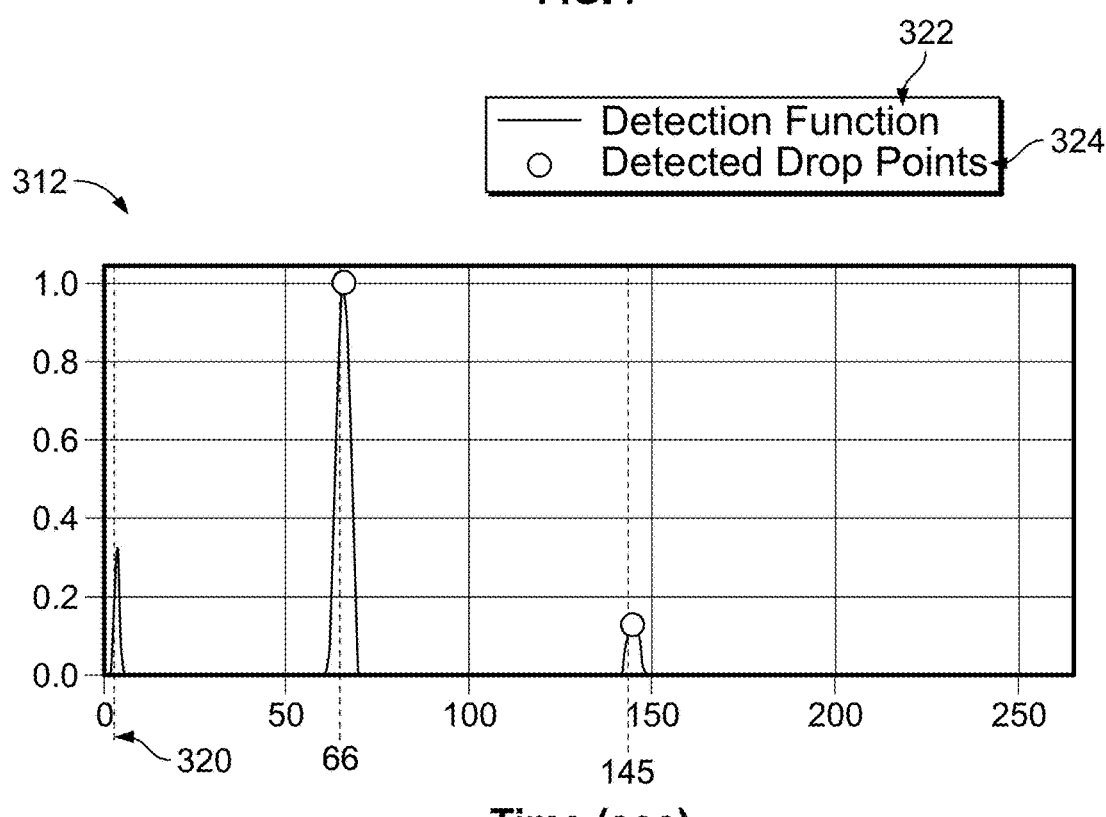
FIG. 8 illustrates an example detection function obtained based on the playhead scrubbing data.

In some embodiments, the track features 230 further includes drop points 260, which are further described and illustrated with reference to FIGS. 6-8.

The track features 230 obtained at operations 206 and 208 can have been pre-computed and stored in a database or library (such as the media data store 162), which can be the library storing the first track and the second track. If necessary, the track features for one or both of the first track and the second track may be computed while the first track is playing at the operation 204.

Figure 4:
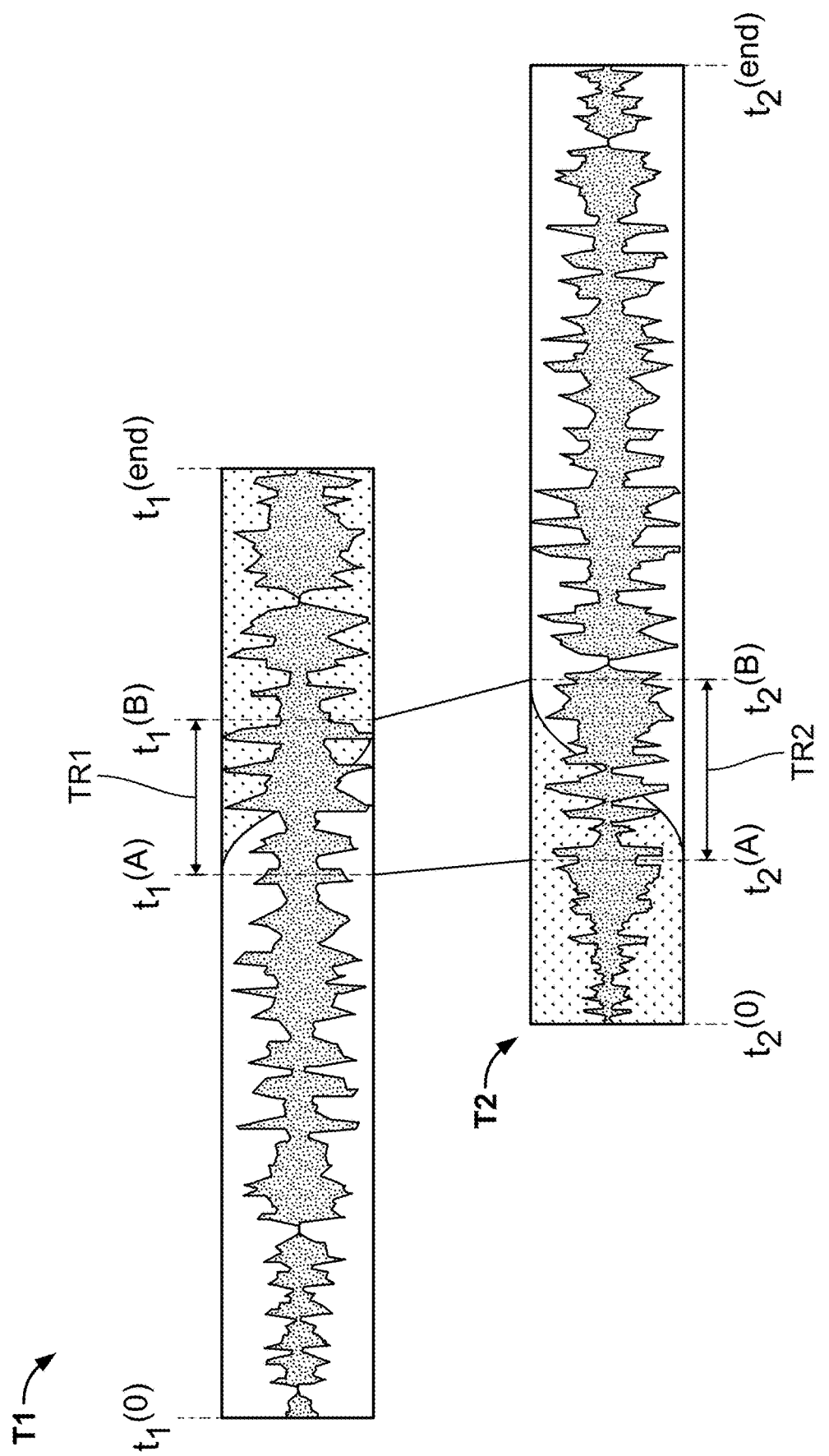
FIG. 4 illustrates the first media content item and the second media content item.

At operation 210, the media delivery system 104 determines a transition position of the first track T1 and a transition position of the second track T2 based on the track features 230 of the first track T1 and the second track T2. In some embodiments, the first track features 230A and the second track features 230B are analyzed to determine a desirable alignment between the first track T1 and the second track T2 for transitioning from the first track T1 and the second track T2. As further described herein, determining the desirable alignment can include comparing the track features 230 of the two tracks T1 and T2, selecting a first transition portion TR1 within the first track T1 and a second transition portion TR2 within the second track T2, and then aligning the first transition portion TR1 and the second transition portion TR2 in time (FIG. 4). In general, the first transition portion TR1 and the second transition portion TR2 can be selected to be the portions of the two tracks that are most similar according to a predetermined comparison method. Examples of such comparison methods are described herein.

The determination of the first and second transition portions or windows TR1 and TR2 may typically be limited to predetermined windows of each track. For example, for the purpose of segueing from one track to the next track in a play list, the first transition portion may be constrained to be within a predetermined window of the last 10 seconds (or last 5 percent) of the first track and the second transition portion may be constrained to be within a predetermined window of the first 20 seconds (or first 10 percent) of the second track. In some embodiments, the predetermined window of the second track may be longer than the predetermined window of the first track. In other embodiments, the predetermined window of the first track may be equal to or longer than the predetermined window in the second track.

In some embodiments, the length of the first and second transition portions may be predetermined. For example, the length of the transition portions may be determined to be 3 seconds or 5 seconds or some other duration, or an equivalent number of beats or other rhythmic units. The length of the transition portions may be determined based on the musical style, tempo, or similarity of the first track and the second track.

Figure 5:
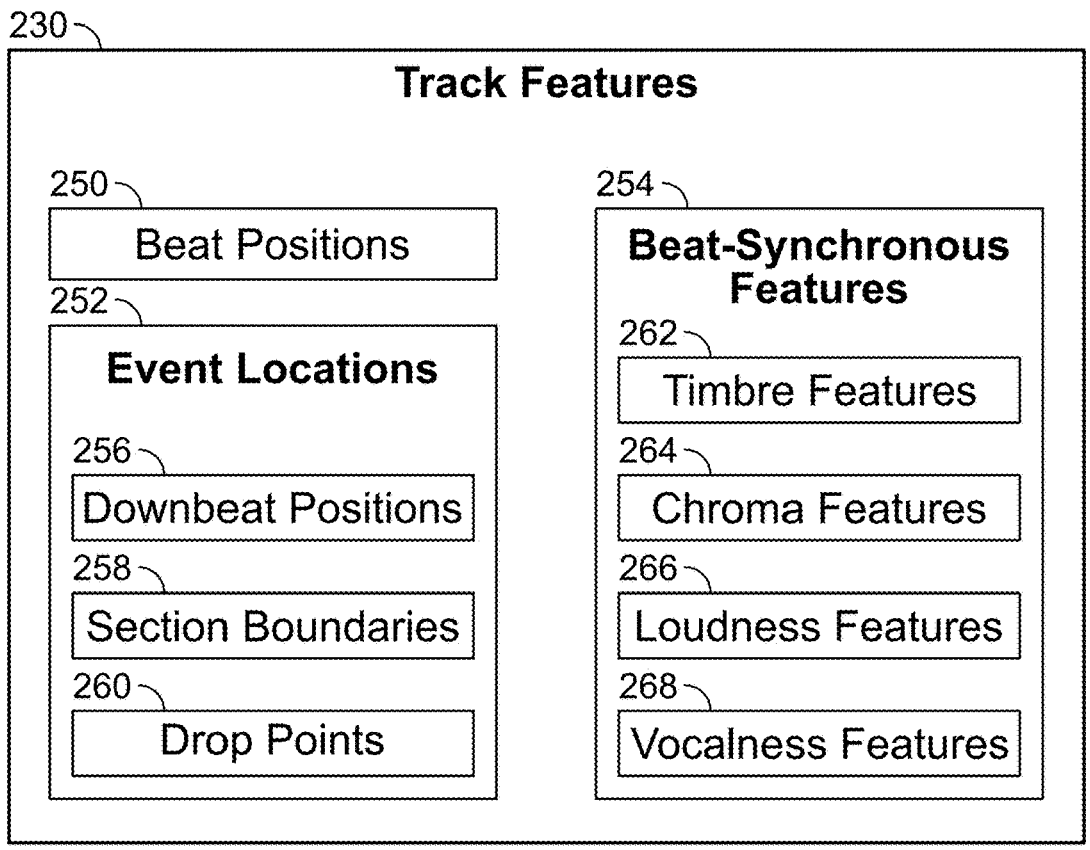
FIG. 5 illustrates example track features of a media content item.

At operation 212, once the first transition portion TR1 and the second transition portion TR2 are determined, the media delivery system 104 aligns the first track T1 and the second track T2. In some embodiments, as shown in FIG. 5, the start $t_1^{(A)}$ of the first transition portion TR1 of the first track T1 is aligned with the start $t_2^{(A)}$ of the second transition portion TR2 of the second track T2. In other embodiments, the end $t_1^{(B)}$ of the first transition portion TR1 of the first track T1 is aligned with the end $t_2^{(B)}$ of the second transition portion TR2 of the second track T2. In yet other embodiments, the start $t_1^{(A)}$ and end $t_1^{(B)}$ of the first transition portion TR1 of the first track T1 is aligned with the start $t_2^{(A)}$ and end $t_2^{(B)}$ of the second transition portion TR2 of the second track T2, respectively. Other alignment methods are also possible in other embodiments.

In some embodiments, during a transition between the first track and the second track, one or both tracks may be time-scaled to match the rhythm of the two tracks during the transition. The rhythms of the two tracks may be matched by equalizing the rates of the beats, downbeats, tatums, or other rhythmic structures between the two tracks. Example alignment methods are further described and illustrated in more detail with reference to FIG. 19.

While the method 200 has been described in terms of transitioning from a first track to a second track, it should be recognized that the first and second tracks may be the same track. The method 200 may be advantageously used for transitioning between a first portion of a track and a second portion of the same track to cause the track to loop endlessly, or to stretch or compress the duration of a track without changing the tempo or sound, for instance by jumping into other similar locations in the track.

FIG. 5 illustrates example track features 230 of a media content item. In some embodiments, the track features 230 include beat positions 250, event locations 252, and beat-synchronous features 254.

In some embodiments, the track features 230 are computed for each track in the media delivery system 104. In other embodiments, the track features 230 can be calculated using one or more software programs running on the media delivery system or one or more other computing devices. Example approaches of computing track features are generally described in Tristan Jehan, *Creating Music by Listening*, Massachusetts Institute of Technology, September 2005.

In this example, the beat positions 250 of each track can be a basis for computing the event locations 252 and the beat-synchronous features 254. In this document, the beat positions 250 for each track are estimated and represented in time as a vector b.

Given the beat positions 250, several types of event locations 252 can be calculated for each track. In some embodiments, each of the event locations 252 can be on the same time grid as the estimated beat positions 250. The event locations 252 can include downbeat positions 256, section boundaries 258, and drop points 260.

The downbeat positions 256 are positions of beats that are accented beats. In some embodiments, a downbeat can be the first beat of the bar. In this document, the downbeat positions 256 can be represented as M which is a set of indices of the beat positions vector b.

The section boundaries 258 can be calculated using various methods. Some example approaches of calculating the section boundaries 258 are generally illustrated in B. McFee and D. P. W. Ellis. Analyzing Song Structure with Spectral Clustering, In 15*th International Society for Music Information Retrieval Conference*, ISMIR, 2014. In this document, the section boundaries 258 can be represented as S which is a set of indices of the beat positions vector b.

The drop points 260 are points in time of a track at which a drastic change in the track occurs. In this document, the drop points 260 can be represented as D which is a set of indices of the beat positions vector b. Example methods for calculating the drop points 260 are further described and illustrated with reference to FIGS. 6-9.

Referring still to FIG. 5, the beat-synchronous features 254 of the track features 230 include timber features 262, chroma features 264, loudness features 266, and vocalness features 268.

The timber features 262 are character or quality of a sound or voice as distinct from its pitch and intensity. A timber feature is a perceived sound quality of a musical note, sound, or tone that distinguishes different types of sound production, such as choir voices, and musical instruments, such as string instruments, wind instruments, and percussion instruments. In this document, the timber features 262 are represented as T which can be a (12×N) matrix (where N is the number of beats) describing the spectral shape of each beat.

The chroma features 264 are representation for music audio in which the entire spectrum is projected into 12 bins representing the 12 distinct semitones (or chroma) of the musical octave. The chroma feature closely relates to the twelve different pitch classes. Chroma-based features, which are also referred to pitch class profiles, are a tool for analyzing music whose pitches can be meaningfully categorized (often into twelve categories) and whose tuning approximates to the equal-tempered scale. Chroma features can capture harmonic and melodic characteristics of music, while being robust to changes in timbre and instrumentation. In this document, the chroma features 264 are represented as C which can be a (12×N) matrix (where N is the number of beats) giving the pitch class distribution for each beat.

The loudness features 266 represent loudness of tracks. In general, transition regions with low loudness can often sound inappropriate and abrupt. In this document, the loudness features 266 are represented as l which can be a (1×N) matrix (where N is the number of beats) describing the loudness for each beat.

The vocalness features 268 provide a probability of presence of vocal in tracks. In general, the presence of vocals may cause overlapping vocals between tracks or cutting over mid-sentence. In this document, the vocalness features 268 are represented as v which can be a (1×N) matrix (where N is the number of beats) describing the probability of vocals for each beat.

Figure 6:
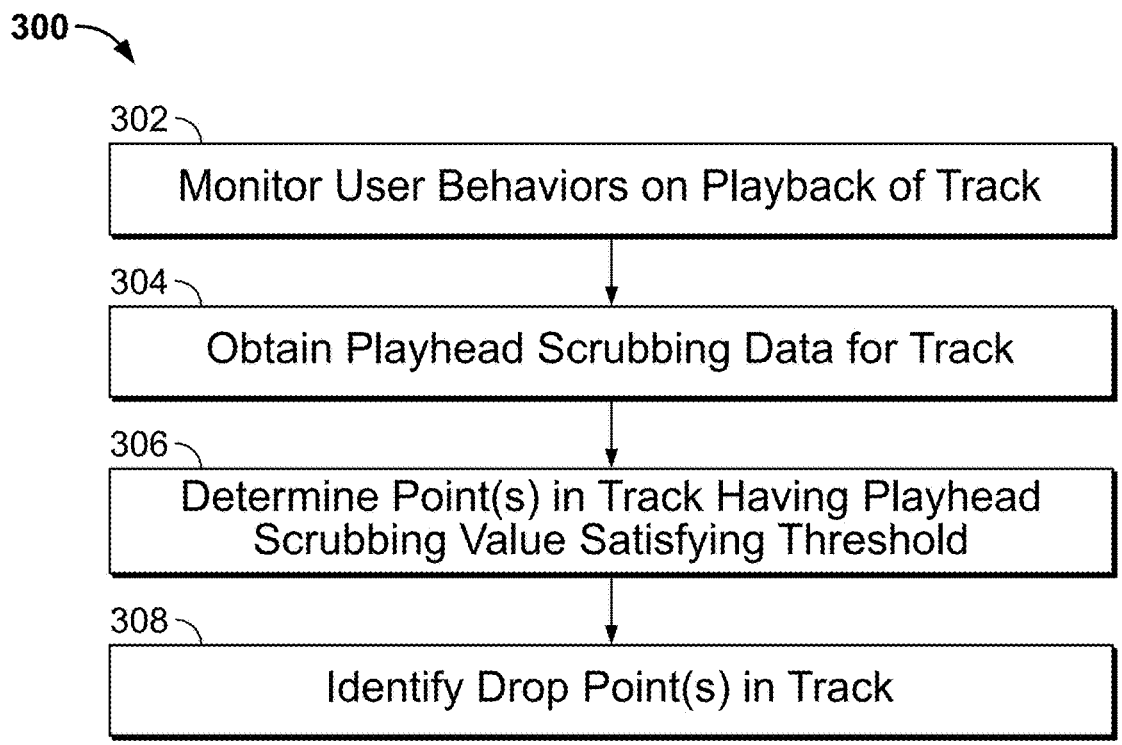
FIG. 6 illustrates an example method for calculating drop points.

FIG. 6 illustrates an example method 300 for calculating drop points 260. The method 300 is described with also reference to FIGS. 7 and 8.

In some embodiments, the method 300 is performed by the media delivery system 104. In other embodiments, the method 300 is performed by one or more other computing devices. The drop points for each track can be pre-computed and stored in the media delivery system 104 and/or one or more other computing devices. For brevity purposes, the method 300 is primarily described as being executed in the media delivery system 104. However, it is understood that any other computing device can also perform at least some of the operations in the method 300.

As described herein, the drop points 260 are used to identify one or more points in time of a track at which a drastic change in the track occurs following a large build. The drop points 260 can be considered as points in a track where exceptionally interesting events occur.

In some embodiments, the drop points 260 are estimated using a crowd-sourced approach. As illustrated in FIG. 6, at operation 302, the media delivery system 104 operates to monitor user behaviors on the playback of each track. In some embodiments, it can be monitored whether users have moved or scrubbed a playhead while listening to a track. Typically, it is found that when users move the playhead, the users tend to move it towards more interesting points in the track. In other embodiments, other user behaviors can also be monitored.

At operation 304, the media delivery system 104 obtains playhead scrubbing data for each track based on the monitoring at the operation 302. Playhead scrubbing data for a track can be represented as a graphical illustration. By way of example, FIG. 7 illustrates an example of playhead scrubbing data for a musical track titled "First of the Year (Equinox)" by Skrillex.

At operation 306, the media delivery system 104 determines one or more points or locations in the track at which playhead scrubbing values satisfy a threshold. At operation 308, the media delivery system 104 identifies the drop points as the points determined at the operation 306.

In some embodiments, one or more drop points can be identified by determining whether the values in the playhead scrubbing data exceed a predetermined threshold. For example, as shown in FIG. 7, the playhead scrubbing data are depicted as a normalized scrub ratio 314 over time, and one or more drop points can be identified when the normalized scrub ratio 314 is greater than a threshold 316. In FIG. 7, the large peak occurring around 66 seconds can mark a first drop point, and the second, smaller peak occurring around 145 seconds can mark a second drop point.

In some embodiments, to identify these peak locations, a standard peak picking approach can be used, such as illustrated in Juan Pablo Bello, Laurent Daudet, Samer Abdallah, Chris Duxbury, Mike Davies, and Mark B Sandler. A Tutorial on Onset Detection in Music Signals. *Speech and Audio Processing, IEEE Transactions on,* 13(5):1035-1047, 2005. For example, an adaptive threshold can be computed using a median filter (e.g., 15 point median filter) and a vertical offset, as illustrated in FIG. 7. Then, as illustrated in FIG. 8, a detection function 322 is computed by subtracting the adaptive threshold from the normalized scrub ratio, and the peaks of the detection function are selected. The resulting peaks correspond to estimates of drop locations 324. In some embodiments, for each peak, the drop index in D is set to the closest downbeat that occurs before the estimated drop location. In other embodiments, the drop index in D can be set differently based on the estimated drop location. If no valid peaks are detected, the set D is empty.

In some embodiments, when executing the method 300, there may be peaks which are not significant musical points. In the example of FIGS. 7 and 8, the track includes a very small peak 320 near the beginning of the track. As such, it is typically found that tracks have a small peak near the beginning. Therefore, in some embodiments, the method 300 can include an operation for removing peaks that occur within a predetermined period of time (such as 15 seconds) from the beginning of each track.

It is understood that the drop points 260 can be estimated using different methods than the method 300. By way of example, the drop points 260 can be determined using content-based approaches. An example content-based approach is generally described in Karthik Yadati, Martha Larson, Cynthia C S Liem, and Alan Hanjalic. Detecting Drops in Electronic Dance Music: Content Based Approaches to a Socially Significant Music Event. In *ISMIR,* pages 143-148, 2014.

Figure 9:
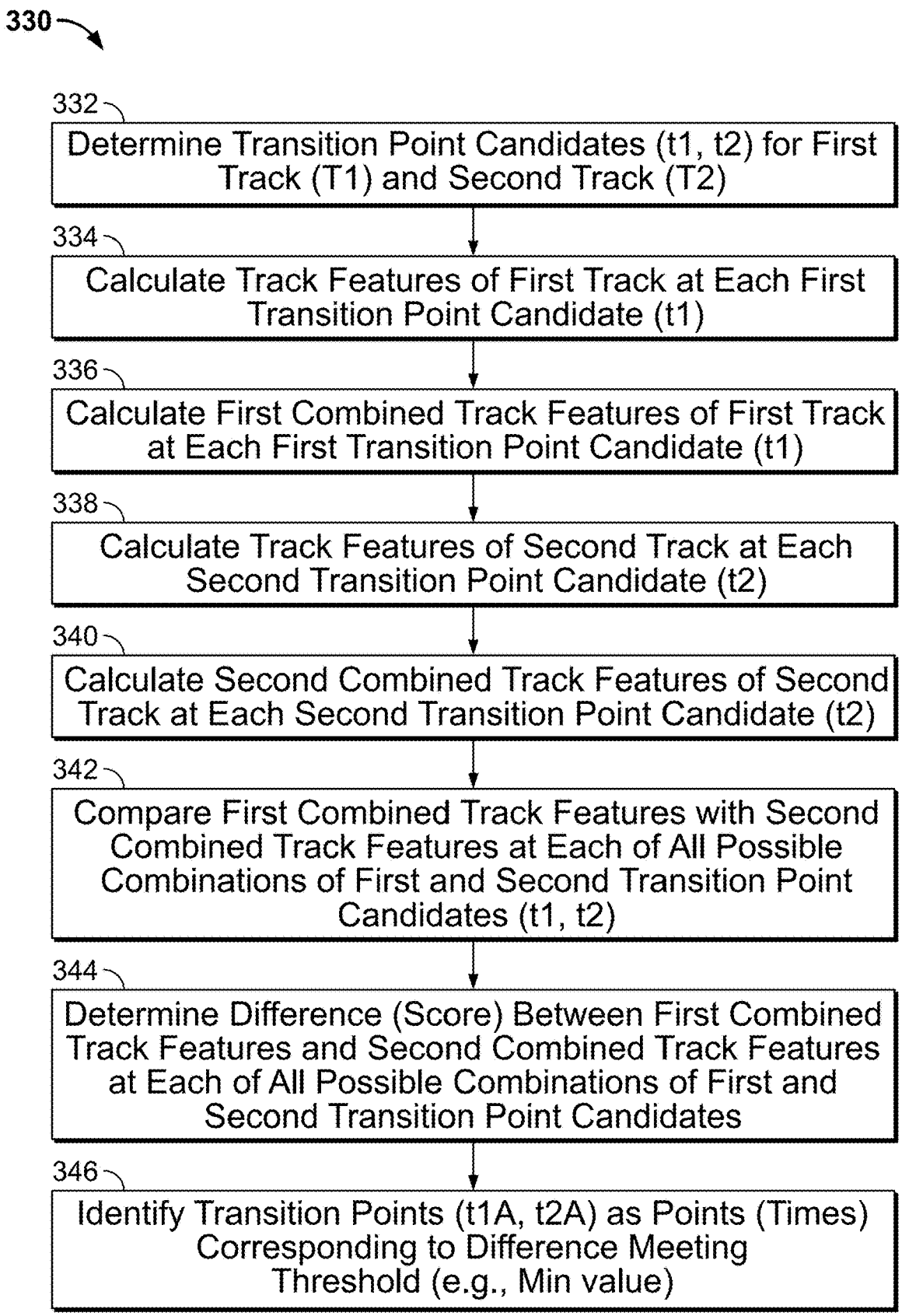
FIG. 9 illustrates an example method for determining transition points of tracks.

FIG. 9 illustrates an example method 330 for determining transition points of tracks, which can be used at the operation 210 in the method 200 as described in FIG. 3. As described herein, the method 330 is also described using the first track T1 and the second track T2 for illustrative purposes. The method 330 is described herein with further reference to FIG. 10, which illustrates selection of transition portions of the first track T1 and the second track T2.

In this example, the method 330 is described as being performed in the media delivery system 104 including the transition determination engine 112. However, in other embodiments, only some of the processes in the method 330 can be performed by the media delivery system 104. In other embodiments, all or some of the processes in the method 330 are performed by the media playback device 102. In yet other embodiments, all or some of the processes in the method 330 are performed by both of the media delivery system 104 and the media playback device 102 in cooperation.

At operation 332, the media delivery system 104 operates to determine transition point candidates $t_1$ of the first track T1 and transition point candidates t2 of the second track T2. For brevity purposes, the transition point candidates $t_1$ of the first track T1 are also referred to herein as first transition point candidates $t_1$, and the transition point candidates t2 of the second track T2 are also referred to herein as second transition point candidates t2.

In some embodiments, the first transition point candidates $t_1$ and the second transition point candidates t2 can include all or some of the beats of the first and second tracks T1 and T2, respectively. In other embodiments, the first transition point candidates $t_1$ and the second transition point candidates t2 can include all or some of the downbeats of the first and second tracks T1 and T2, respectively. In yet other embodiments, the first transition point candidates $t_1$ and the second transition point candidates t2 can include other temporal features of the first and second tracks T1 and T2, respectively.

At operation 334, the media delivery system 104 calculates one or more track features 230 of the first track T1 associated with each of the first transition point candidates $t_1$. In some embodiments, at least one of the track features are calculated as track features at each first transition point candidate. In addition or alternatively, at least one of the track features are calculated as track features over a duration (e.g., a transition portion or window) including that first transition point candidate. In some embodiments, the track features 230 include at least one of the features described with reference to FIG. 5.

At operation 336, the media delivery system 104 calculates a first combined track feature of the first track T1 associated with each of the first transition point candidates $t_1$. The first combined track feature can be an aggregation of the track features 230 obtained at the operation 334. Various approaches can be used to calculate such an aggregation. For example, the first combined track feature can be a weighted sum of the track features 230 of the first track.

At operation 338, the media delivery system 104 calculates one or more track features 230 of the second track T2 associated with each of the second transition point candidates t2. In some embodiments, at least one of the track features are calculated as track features at each second transition point candidate. In addition or alternatively, at least one of the track features are calculated as track features over a duration (e.g., a transition portion or window) including that second transition point candidate. In some embodiments, the track features 230 include at least one of the features described with reference to FIG. 5.

At operation 340, the media delivery system 104 calculates a second combined track feature of the second track T2 associated with each of the second transition point candidates t2. The second combined track feature can be an aggregation of the track features 230 obtained at the operation 338. Various approaches can be used to calculate such an aggregation. For example, the second combined track feature can be a weighted sum of the track features 230 of the second track.

At operation 342, the media delivery system 104 compares between the first combined track feature and the second combined track feature associated with each of all possible combinations of the first transition point candidates $t_1$ and the second transition point candidates t2.

Figure 10:
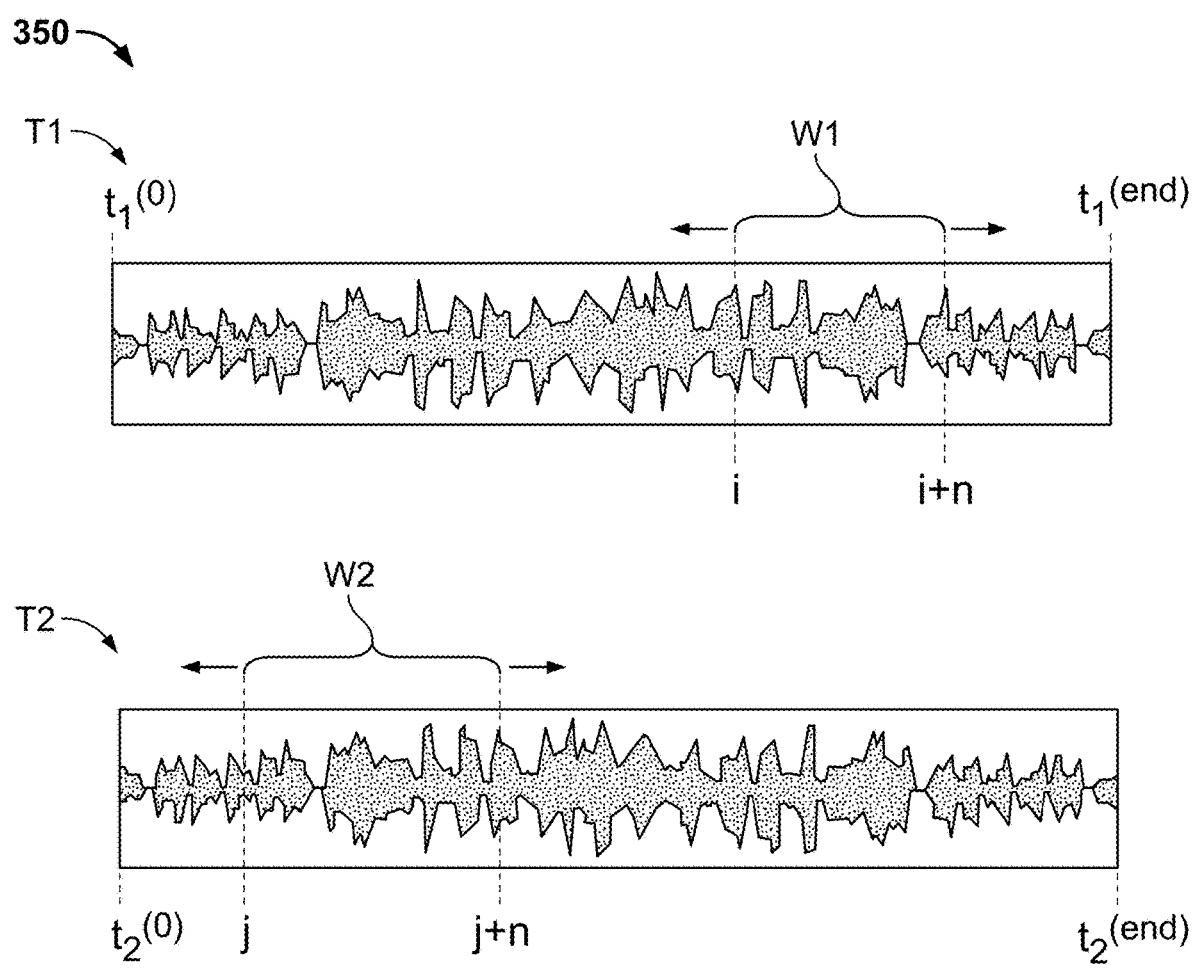
FIG. 10 illustrates selection of transition portions of the first track and the second track.

By way of example, as illustrated in FIG. 10, a sliding window comparison between every possible transition portion of the first track and every possible transition portion of the second track may be performed. The number of possible transition portions for a track depends on the number of transition point candidates of the track, the length of a transition window (i.e., a time period within the track in which a transition to a subsequent track should occur), and the length of the transition portion.

In some embodiments, to perform the sliding window comparison, the track features may be considered as a vector. The sliding window comparison of first and second tracks may then be performed by comparing each of the vectors representing possible transition portions of the first track with each of the vectors representing possible transition portions of the second track. Pairs of vectors may be compared, for example, by computing the Euclidean distance between them.

At operation 344, the media delivery system 104 determines difference between the first combined track feature and the second combined track feature at each of all the possible combinations of the first transition point candidates $t_1$ and the second transition point candidates $t_2$. In some embodiments, such difference is represented as a value or score, which may be normalized.

At operation 346, the media delivery system 104 identifies a set of transition point $t_1^{(A)}$ of the first track T1 and transition point $t_2^{(A)}$ of the second track T2 as the pair of one first transition point candidates $t_1$ and one second transition point candidates $t_2$ that corresponds to the difference between the first combined track feature and the second combined track feature that meets a threshold. In some embodiments, the first transition point $t_1^{(A)}$ and the transition point $t_2^{(A)}$ are the first transition point candidates $t_1$ and the second transition point candidates $t_2$ that are associated with the minimum value or score in difference between the first combined track feature and the second combined track feature. In the case where the comparison is performed by calculating the Euclidean distance between pairs of vectors representing possible transition portions of the first and second tracks, respectively, the vector pair with the smallest Euclidean distance may identify the most similar transition portions.

Figure 11:
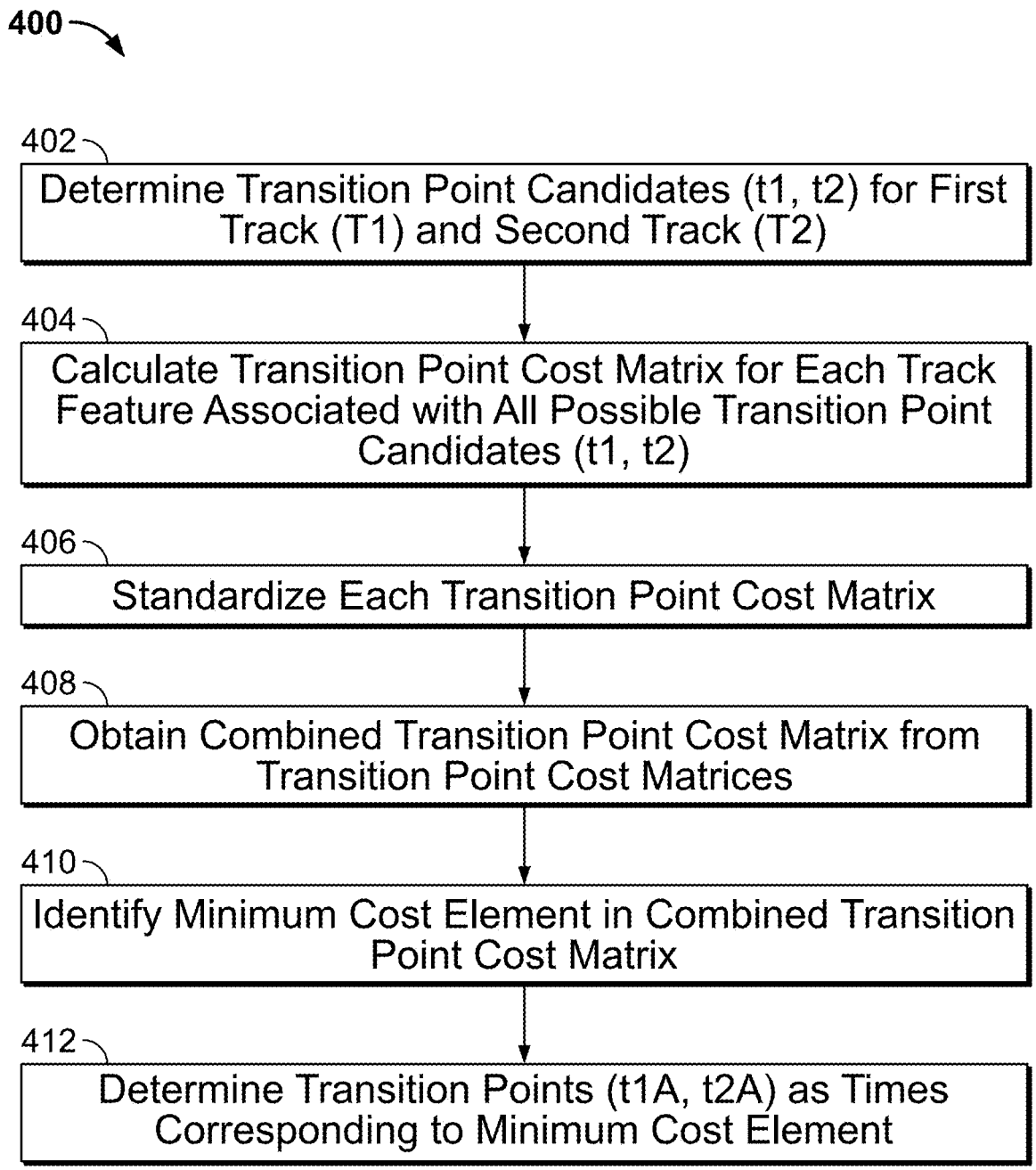
FIG. 11 illustrates another example method for determining transition points between tracks.

FIG. 11 illustrates another example method 400 for determining transition points between tracks, which can be used at the operation 210 in the method 200 as described in FIG. 3. As described herein, the method 400 is also described using the first track T1 and the second track T2 for illustrative purposes. The method 400 is described herein with further reference to FIGS. 4 and 10, as well as FIGS. 12-18 which illustrate example transition point cost matrices for the first track T1 and the second track T2.

In this example, the method 400 is described as being performed in the media delivery system 104 including the transition determination engine 112. However, in other embodiments, only some of the processes in the method 400 can be performed by the media delivery system 104. In other embodiments, all or some of the processes in the method 400 are performed by the media playback device 102. In yet other embodiments, all or some of the processes in the method 400 are performed by both of the media delivery system 104 and the media playback device 102 in cooperation.

At operation 402, the media delivery system 104 determine transition point candidates $t_1$ for the first track T1 and transition point candidates $t_2$ for the second track T2. In some embodiments, a length of transition portion (also referred to herein as transition length) can be predetermined for the first track T1 and/or the second track T2. For example, the transition length is determined in terms of the number of beats. In the illustrated example of FIG. 10, the transition length is set as n beats such that candidate transition portions or windows W1 of the first track T1 has a length of n beats and candidate transition portions or windows W2 of the second track T2 has the same length of n beats.

As illustrated in FIG. 4, to align the first track T1 and the second track T2, the media delivery system 104 selects the transition portion TR1 of the first track T1 and the transition portion TR2 of the second track T2. As described herein, the media delivery system 104 determines the start $t_1^{(A)}$ of the first transition portion TR1 and the start $t_2^{(A)}$ of the second transition portion TR2 and align the first track T1 with the second track T2 by matching the start $t_1^{(A)}$ and end $t_1^{(B)}$ of the first transition portion TR1 with the start $t_2^{(A)}$ and end $t_2^{(B)}$ of the second transition portion TR2, respectively. Where the transition length (in units of the number of beats) is given, the end $t_1^{(B)}$ of the first transition portion TR1 and the end $t_2^{(B)}$ of the second transition portion TR2 are determined from the values of the start $t_1^{(A)}$ of the first transition portion TR1 and the start $t_2^{(A)}$ of the second transition portion TR2. Therefore, a transition between the first track T1 and the second track T2 may only need selection and alignment of the points, $t_1^{(A)}$ and $t_2^{(A)}$.

The transition point candidates $t_1$ and $t_2$ provide candidates for the start $t_1^{(A)}$ of the first transition portion TR1 and the start $t_2^{(A)}$ of the second transition portion TR2. In some embodiments, the transition point candidates $t_1$ and $t_2$ are set as downbeat positions M1 and M2 of the first and second tracks T1 and T2, respectively.

In some embodiments, the transition point candidates $t_1$ and $t_2$ are determined by pruning a portion of the first track T1 and/or a portion of the second track T2, which are obviously inappropriate portions of the tracks for transitions. Various methods or rules can be used to perform the pruning. By way of example, the pruning can be performed according to the following rules: (1) $t_1^{(B)}$ occurs before the fade-out and $t_2^{(A)}$ is after the fade-in; and (2) $t_1^{(B)}$ occurs within a predetermined portion (for example, the last 25%) of the first track and $t_2^{(A)}$ occurs within a predetermined portion (for example, the first 20%) of the second track. In other examples, any variations or other rules can be used. After pruning, the remaining points in $t_1$ and $t_2$ are considered valid transition point candidates. The pruned sets are the output of the candidates function in Algorithm 1 below.

At operation 404, the media delivery system 104 operates to calculate a transition point cost matrix for each track feature associated with all possible transition point candidates. In some embodiments, for each pair of transition point candidates $t_1$ and $t_2$, pairwise comparisons are calculated along a series of different track features over an entire overlapping region. As illustrated in FIG. 10, for a transition of length n beats, the overlapping region can be represented as beginning at beats i and j, and ending at beats i+n and j+n, for the first track T1 and the second track T2, respectively.

Figure 16:
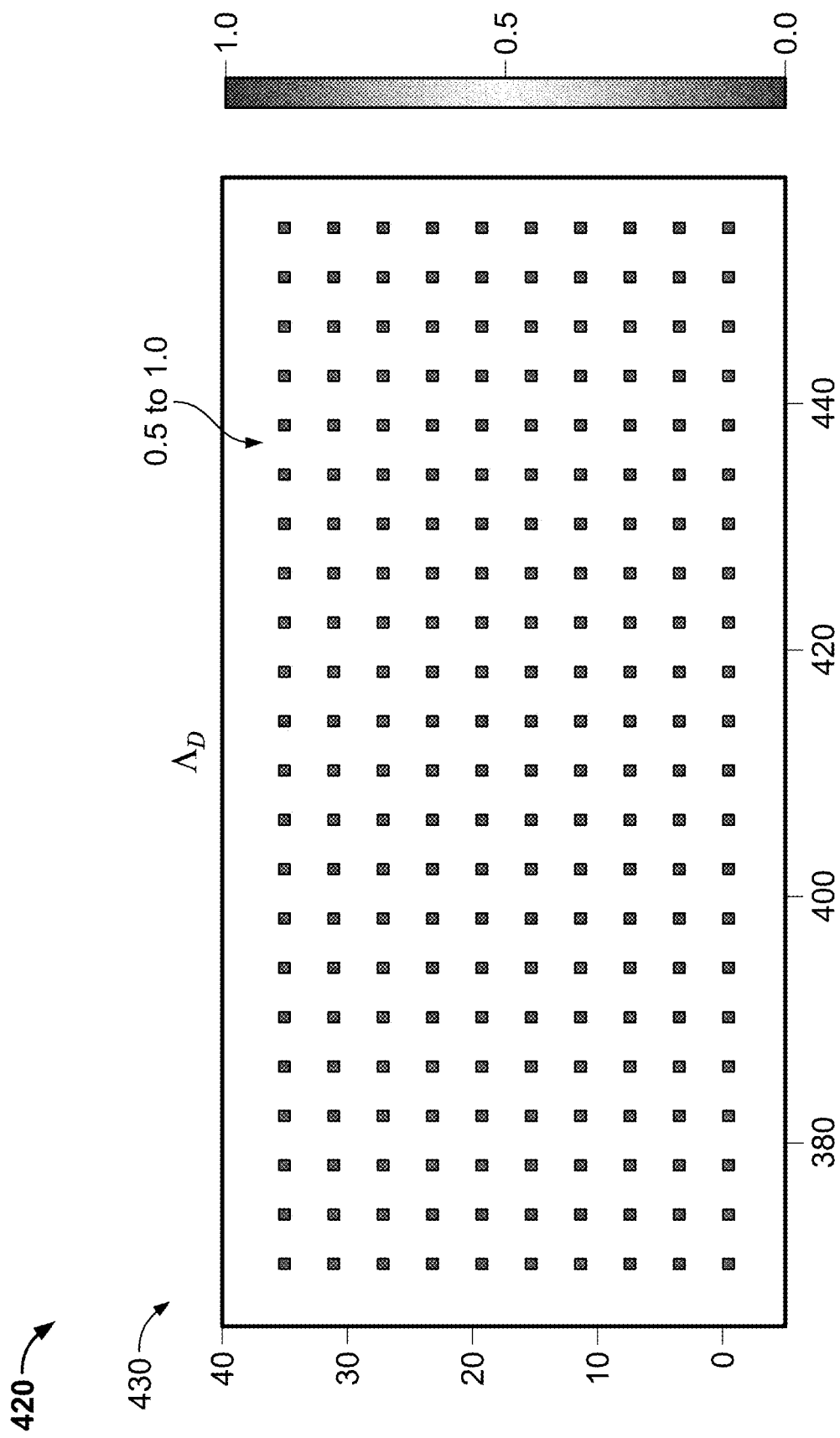
FIG. 16 illustrates an example transition point cost matrix for a drop point comparison.
Figure 17:
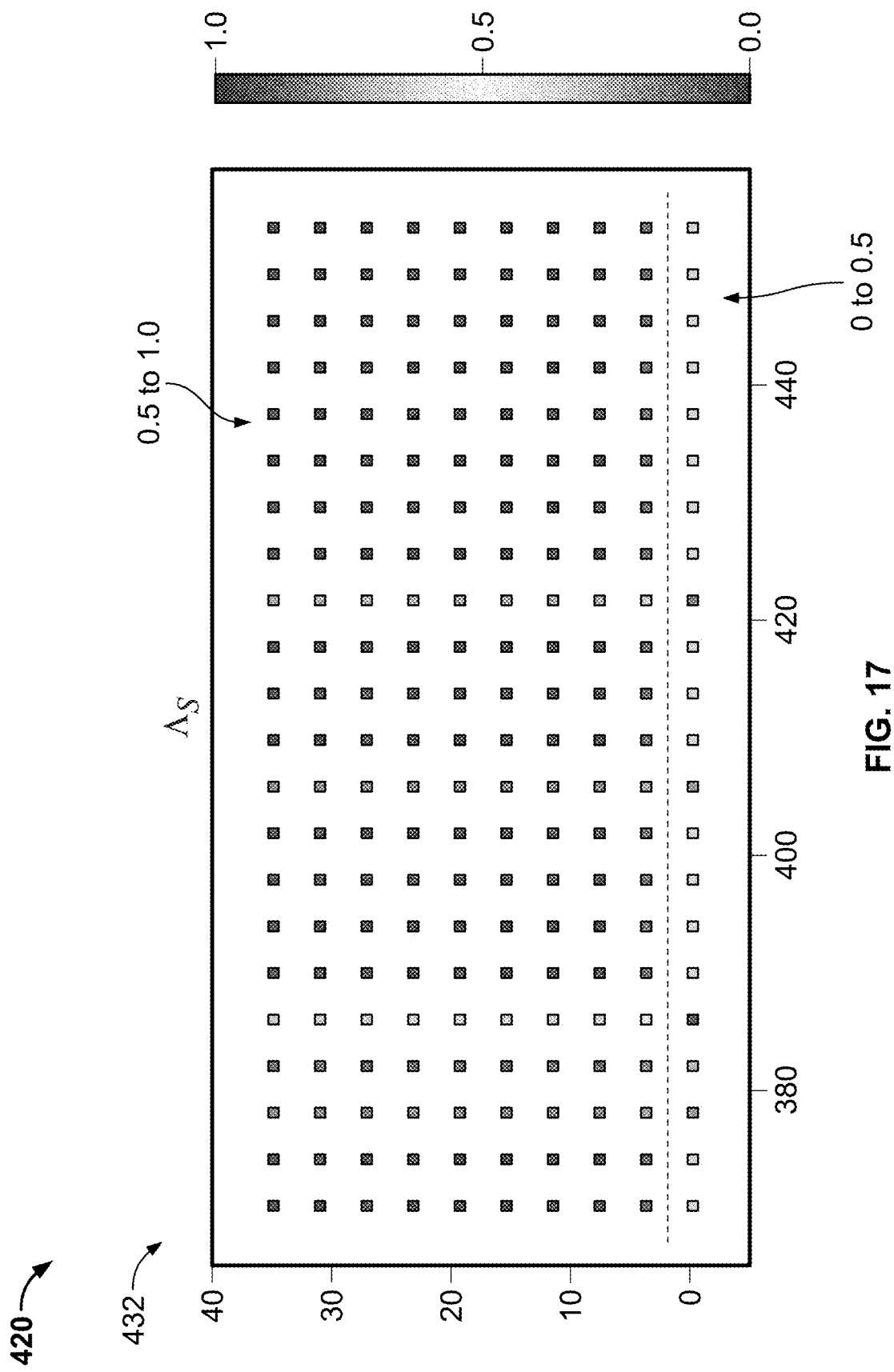
FIG. 17 illustrates an example transition point cost matrix for a section boundary comparison.

Transition point cost matrices 420 ($\Lambda_x$) can be calculated for various track feature comparisons x. In some embodiments, the transition point cost matrices 420 include at least one of a first transition point cost matrix 422 ($\Lambda_T$) for a timbre (T) comparison (FIG. 12), a second transition point cost matrix 424 ($\Lambda_C$) for a chroma feature (C) comparison (FIG. 13), a third transition point cost matrix 426 ($\Lambda_l$) for a loudness feature (l) comparison (FIG. 14), a fourth transition point cost matrix 428 ($\Lambda_v$) for a vocalness feature (v)

comparison (FIG. 15), a fifth transition point cost matrix 430 ($\Lambda_D$) for a drop point (D) comparison (FIG. 16), and a sixth transition point cost matrix 432 ($\Lambda_S$) for a section boundary (S) comparison (FIG. 17). In other embodiments, the transition point cost matrices 420 include less of these matrices and/or further include one or more transition point cost matrices of different comparisons.

As illustrated in FIGS. 12-18, each of the transition point cost matrices 420 has one axis (for example, horizontal axis) representing the beat indices of the first track T1 and the other axis (for example, vertical axis) representing the beat indices of the second track T2. Each index or element in the transition point cost matrices 420 represents a level of similarity in corresponding track features between the first track T1 and the second track T2 at a pair of beat points of the first track T1 and the second track T2. In the examples of FIGS. 12-18, the matrix indices are represented as rectangular dots which are colored and/or shaded differently according to the values of the indices.

By way of example, in FIGS. 12-18 the matrix values are graphically depicted in greyscale, where the darkness of the grayscale shading represents a value from one of two different scales, which are illustrated in the key provided on the right hand side of each of FIGS. 12-18. A first gradation scale is provided for values from 0.0 to 0.5, and a second gradation scale is provided for values from 0.5 to 1.0. The darkest grayscale shading (e.g., black) in a region using the first gradation scale represents a value of 0, and the darkest grayscale shading (e.g., black) in a region using the second gradation scale represents a value of 1. The lightest grayscale shading (e.g., white) represents a value of 0.5. Shades between the lightest and darkest shadings represent values therebetween (i.e., in the first gradation scale the shades represent values between 0 and 0.5, and in the second gradation scale the shades represent values between 0.5 and 1). In order to illustrate which of the two gradation scales is being used, dashed lines are provided identifying boundaries between the different gradation regions. Each gradation region is labelled to show whether the first or second gradation scale applies to the values within each region.

In some embodiments, the transition point cost matrices 420 can be standardized so that the minimum cost is zero (0) and the maximum cost is one (1). In the illustrated examples, therefore, such values in the matrices range from 0.0 to 1.0 as shown on the right side of the matrices. In other embodiments, the matrix indices can be represented as numerical values or scores indicating the level of similarity thereat.

Figure 12:
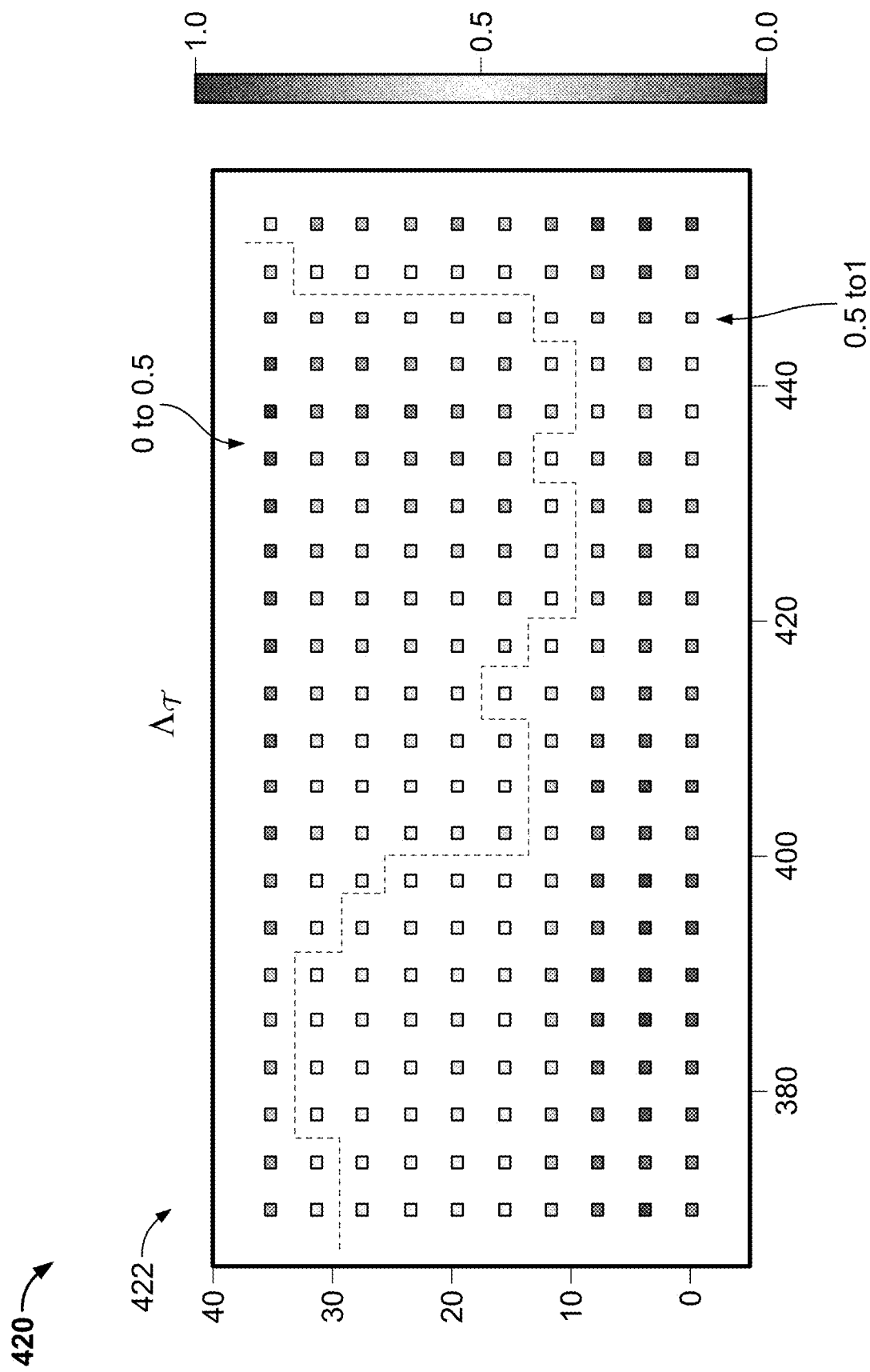
FIG. 12 illustrates an example transition point cost matrix for a timbre comparison.

As shown in FIG. 12, for timbre features, one embodiment of the first transition point cost matrix 422 ($\Lambda_T$) for the timbre (T) comparison is computed as the Euclidean distance between the timbre features directly, as described in Algorithm 1, line 9.

Figure 13:
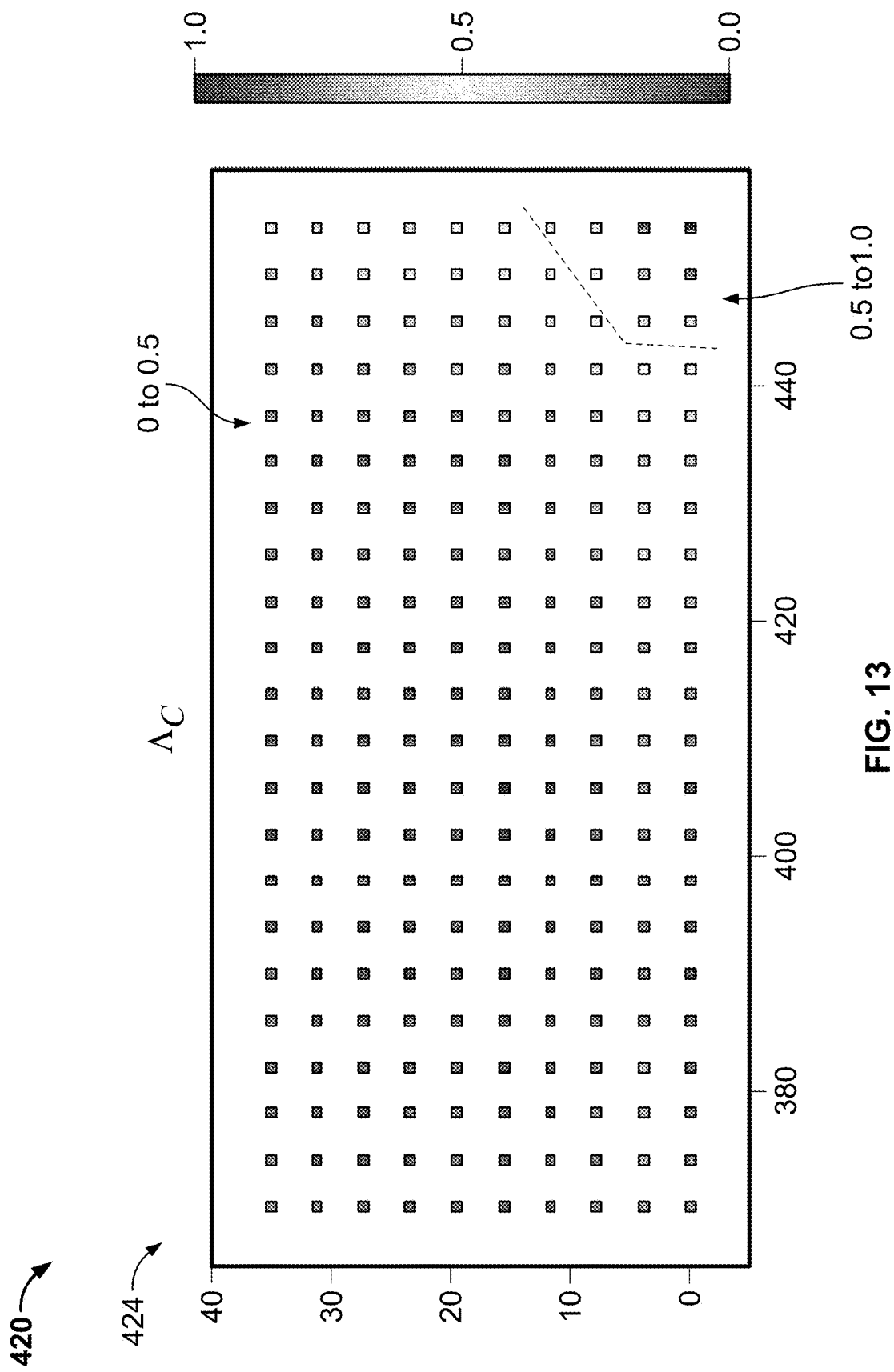
FIG. 13 illustrates an example transition point cost matrix for a chroma feature comparison.

As shown in FIG. 13, for chroma features, one embodiment of the second transition point cost matrix 424 ($\Lambda_C$) for the chroma feature (C) comparison is computed as the Euclidean distance between the chroma features directly, as described in Algorithm 1, line 10.

Figure 14:
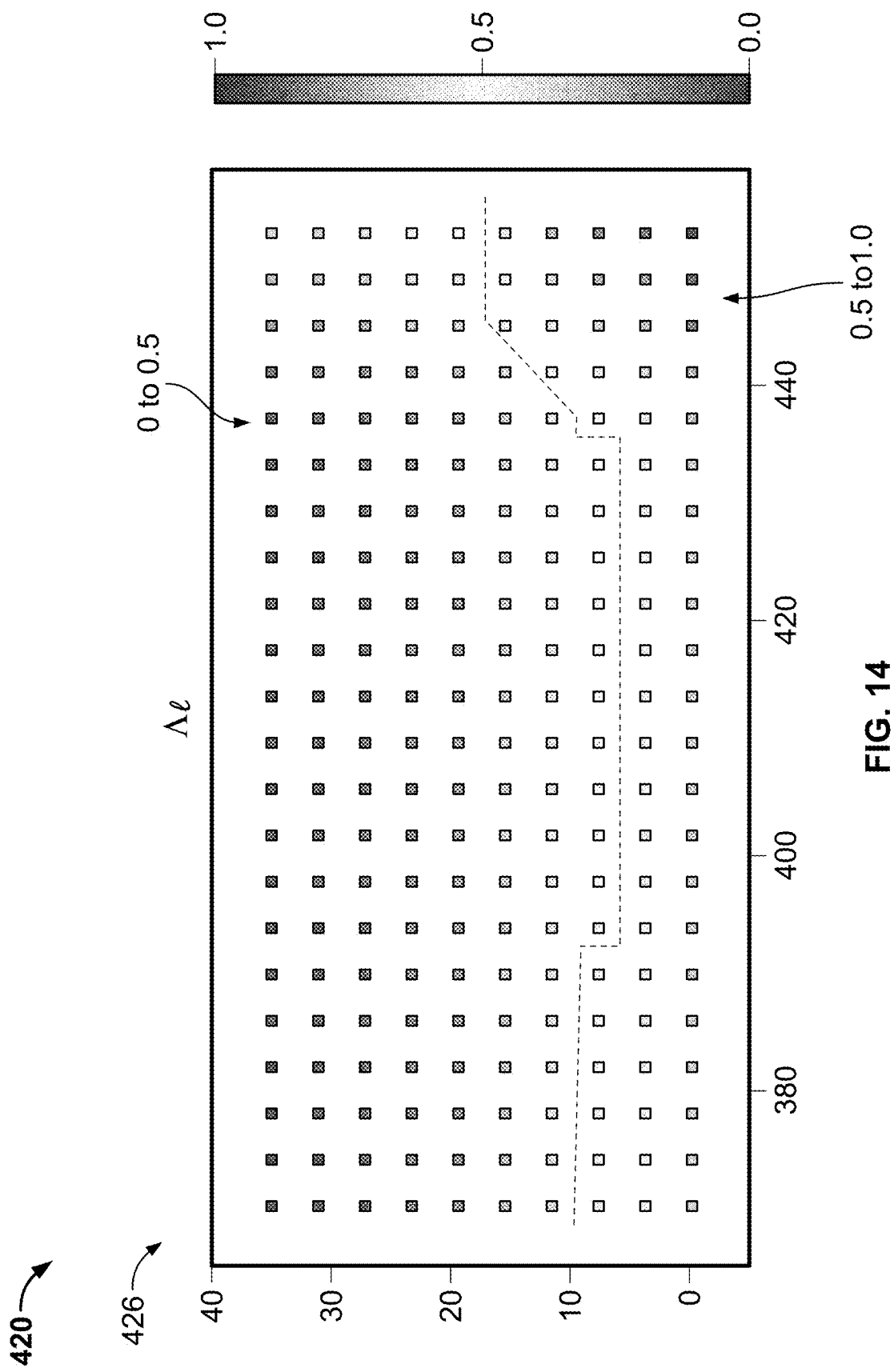
FIG. 14 illustrates an example transition point cost matrix for a loudness feature comparison.

As shown in FIG. 14, for loudness features, one embodiment of the third transition point cost matrix 426 ($\Lambda_l$) for the loudness feature (l) comparison is calculated as the sum of the average inverse loudness for each track, as described in Algorithm 1, line 11. This calculation can give regions that are loud in both tracks a low transition cost.

Figure 15:
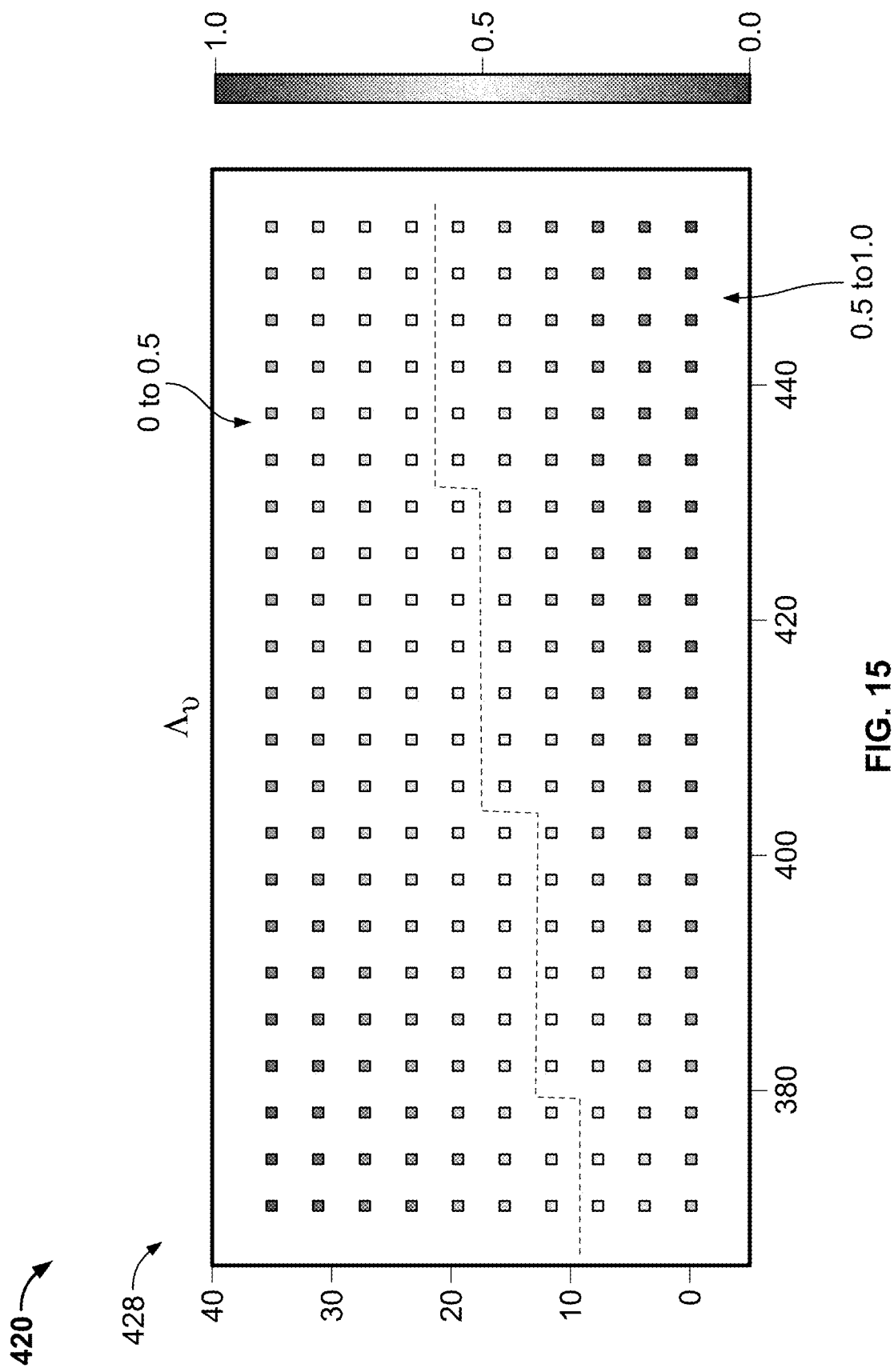
FIG. 15 illustrates an example transition point cost matrix for a vocalness feature comparison.

As shown in FIG. 15, for vocalness features, one embodiment of the fourth transition point cost matrix 428 ($\Lambda_v$) for the vocalness feature (v) comparison is calculated as the sum of the average probability of vocal presence for each track, as described in Algorithm 1, line 12. This calculation can assign transitions which both have vocals a high transition cost.

As shown in FIG. 16, one embodiment of the fifth transition point cost matrix 430 ($\Lambda_D$) for the drop point (D) comparison is calculated to indicate whether transitions end on a drop point in both or either of the first and second tracks and assign a high transition cost if transitions do not end on a drop point. In some embodiments, the matrix 430 ($\Lambda_D$) is calculated with a score of zero (0) if the beat positions of both of the first and second tracks end on drop points in the first and second tracks, a score of one (1) if only one of the beat positions of the first and second tracks ends on a drop point, and a score of two (2) if neither of the beat positions of the first and second tracks ends on a drop point. This is described in Algorithm 1, line 13. In the illustrated example of FIG. 16, the first and second tracks have no drop point detected, and therefore the fifth transition point cost matrix 430 ($\Lambda_D$) is a uniform matrix.

As shown in FIG. 17, one embodiment of the sixth transition point cost matrix 432 ($\Lambda_S$) for the section boundary (S) comparison is calculated to indicate whether transitions end on a section boundary in both or either of the first and second tracks and assign a high transition cost if transitions do not end on a section boundary. In some embodiments, the matrix 432 ($\Lambda_S$) is calculated with a score of zero (0) if the beat positions of both of the first and second tracks end on section boundaries in the first and second tracks, a score of one (1) if only one of the beat positions of the first and second tracks ends on a section boundary, and a score of two (2) if neither of the beat positions of the first and second tracks ends on a section boundary. This is described in Algorithm 1, line 14.

Referring still to FIG. 11, at operation 406, each of the transition point cost matrices 420 is standardized so that the minimum cost is zero (0) and the maximum cost is one (1) for each matrix index. As shown in FIGS. 12-17, all the indices in the transition point cost matrices 420 are standardized with a value ranging from zero to one. In this example, a higher value indicates a poorer pair of transitions for a particular track feature.

At operation 408, the media delivery system 104 calculates a combined transition point cost matrix 440 ($\Lambda$) based on a plurality of the transition point cost matrices 420. In some embodiments, the combined transition point cost matrix 440 can be computed as a sum of each feature's transition point cost matrix after standardization. In some embodiments, the sum of the transition point cost matrices can be weighted. For example, the weights are chosen by optimizing over a small training set. In the illustrated example of FIG. 18, the combined transition point cost matrix 440 ($\Lambda$) is obtained as a weighted sum of the first, second, third, fourth, fifth, and sixth transition point cost matrices 422, 424, 426, 428, 430, and 432.

Figure 18:
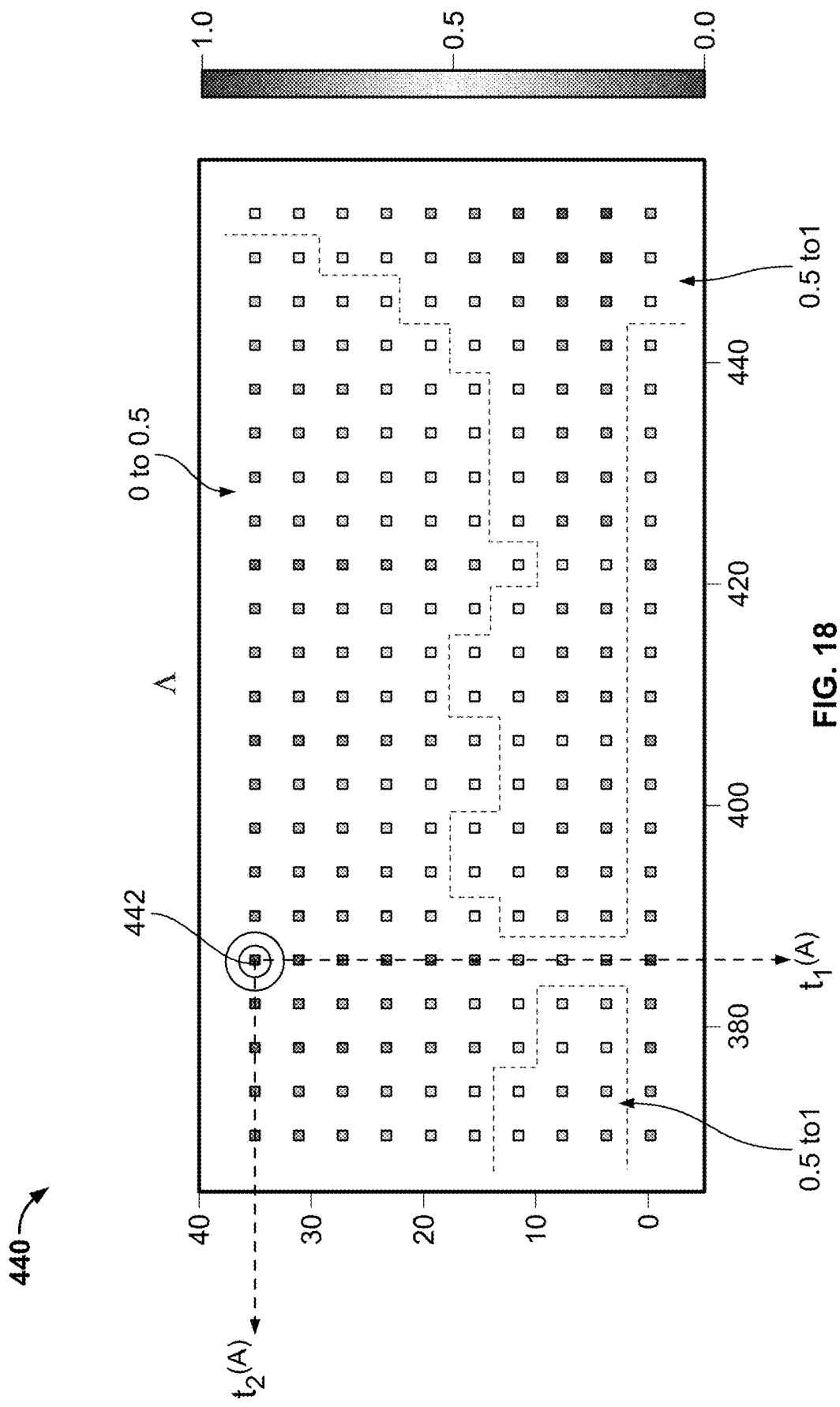
FIG. 18 illustrates an example combined transition point cost matrix.

At operation 410, the media delivery system 104 identifies a minimum cost element in the combined transition point cost matrix 440 ($\Lambda$). In FIG. 18, a matrix element 442, which is identified with a circle, is determined to have the lowest value among all the element in the combined transition point cost matrix 440 ($\Lambda$).

At operation 412, the media delivery system 104 determines the transition points $t_1^{(A)}$ and $t_2^{(A)}$ which are the times corresponding to the minimum cost element 442 in the combined transition point cost matrix 440 ($\Lambda$). As described herein, in some embodiments, the transition length (in units of the number of beats) is given. Therefore, the end $t_1^{(B)}$ of the first transition portion TR1 and the end $t_2^{(B)}$ of the second transition portion TR2 are determined from the start $t_1^{(A)}$ of the first transition portion TR1 and the start $t_2^{(A)}$ of the second transition portion TR2

The method 400 as described herein can be outlined in Algorithm 1:

```
                          Algorithm 1
1:   procedure TRANSITION-POINTS (T₁, T₂, n)
2:       b₁ ← beats(T₁)  b₂ ← beats(T₂)
3:       T₁, C₁, ℓ₁, v₁, M₁, D₁, S₁ ← features (T₁, b₁)
4:       T₂, C₂, ℓ₂, v₂, M₂, D₂, S₂ ← features (T₂, b₂)
5:       t₁ ← candidates(T₁, M₁, S₁, D₁, ℓ₁)
6:       t₂ ← candidates(T₂, M₂, S₂, D₂, ℓ₂)
7:       for i ∈ t₁, j ∈ t₂ do
8:           iₙ ← i + n   jₙ ← j + n
9:           Λ_T[i, j] ← norm(T₁[i : iₙ] − T₂ [j : jₙ])
10:          Λ_C[i, j] ← norm(C₁[i : iₙ] − C₂ [j : jₙ])
11:          Λ_ℓ[i, j] ← avg (2 − (ℓ₁[i : iₙ] + ℓ₂[j : jₙ]))
12:          Λ_v[i, j] ← avg (v₁[i : iₙ]) + avg (v₂[j : jₙ])
13:          Λ_D [i, j] ← 1_{i∉D1} + 1_{j∉D2}
14:          Λ_S [i, j] ← 1_{i∉S1} + 1_{j∉S2}
15:      end for
16:      Λ ← [Λ_T, Λ_C, Λ_ℓ, Λ_v, Λ_D, Λ_S]
17:      for k ∈ Λ do
18:          k ← standardize (k)
19:      end for
20:      Λ ← weightedAvg (Λ_T, Λ_C, Λ_ℓ, Λ_v, Λ_D, Λ_S)
21:      i*, j* ← argmin (Λ)
22:      t₁^{(A)}, t₂^{(A)} ← b₁[i*], b₂[j*]
23:      return t₁^{(A)}, t₂^{(A)}
24:  end procedure
```

In Algorithm 1, the notation [i: $i_n$] denotes a region beginning at beat i and ending at beat $i_n$. For example, T [i: $i_n$] denotes timbre features within the region beginning at beat i and ending at beat $i_n$. The functions beats and features are described herein, such as with reference to FIGS. 5-8, and used in the operation 404 of the method 400 (FIG. 11) and the Candidates function is used in the operation 402 of the method 400 (FIG. 11).

Figure 19:
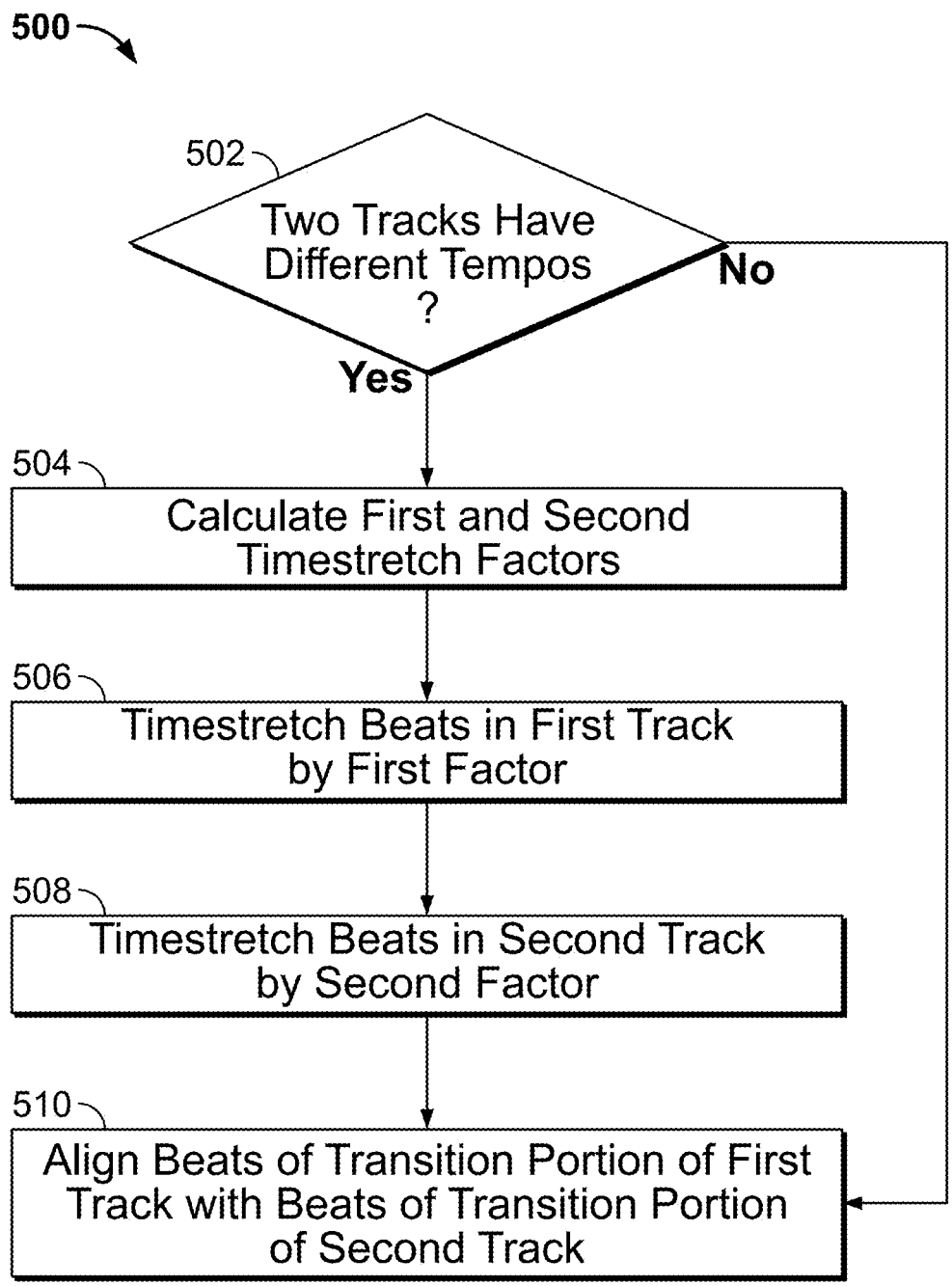
FIG. 19 illustrates an example method for rendering the transition from the first track to the second track.

FIG. 19 illustrates an example method 500 for rendering the transition from the first track T1 to the second track T2, which can be used at the operation 212 in the method 200 as described in FIG. 3. The method 500 is described herein with further reference to FIGS. 20-22.

In this example, the method 500 is described as being performed in the media delivery system 104 including the transition determination engine 112. However, in other embodiments, only some of the processes in the method 500 can be performed by the media delivery system 104. In other embodiments, all or some of the processes in the method 500 are performed by the media playback device 102. In yet other embodiments, all or some of the processes in the method 500 are performed by both of the media delivery system 104 and the media playback device 102 in cooperation.

At operation 502, the media delivery system 104 determines whether the first and second tracks have different tempos. In some embodiments, the transitions (such as crossfade and spinback transitions) are rendered such that the beats in the two tracks occur at the same time. However, in many cases, the tempos of two tracks are not perfectly in sync. If it is determined that the tempos of the first and second tracks are identical or substantially identical, the method 500 skips to operation 510 ("NO" at this operation), in which the first transition portion TR1 of the first track T1 is aligned with the second transition portion TR2 of the second track T2 by matching at least one of the beats from the first transition portion TR1 and the second transition portion TR2. Otherwise ("YES" at this operation), the method 500 moves to operation 504.

At operation 504, the media delivery system 104 calculates first and second time-stretch factors F1 and F2, which are used to time-stretch the beats in the first and second tracks T1 and T2, respectively. With the time-stretch factors, each beat of the first and second tracks can be time-stretched such that both or either of the tempo of the first track and/or the tempo of the second track slowly changes until the beats are matched between the first and second tracks.

Figure 20:
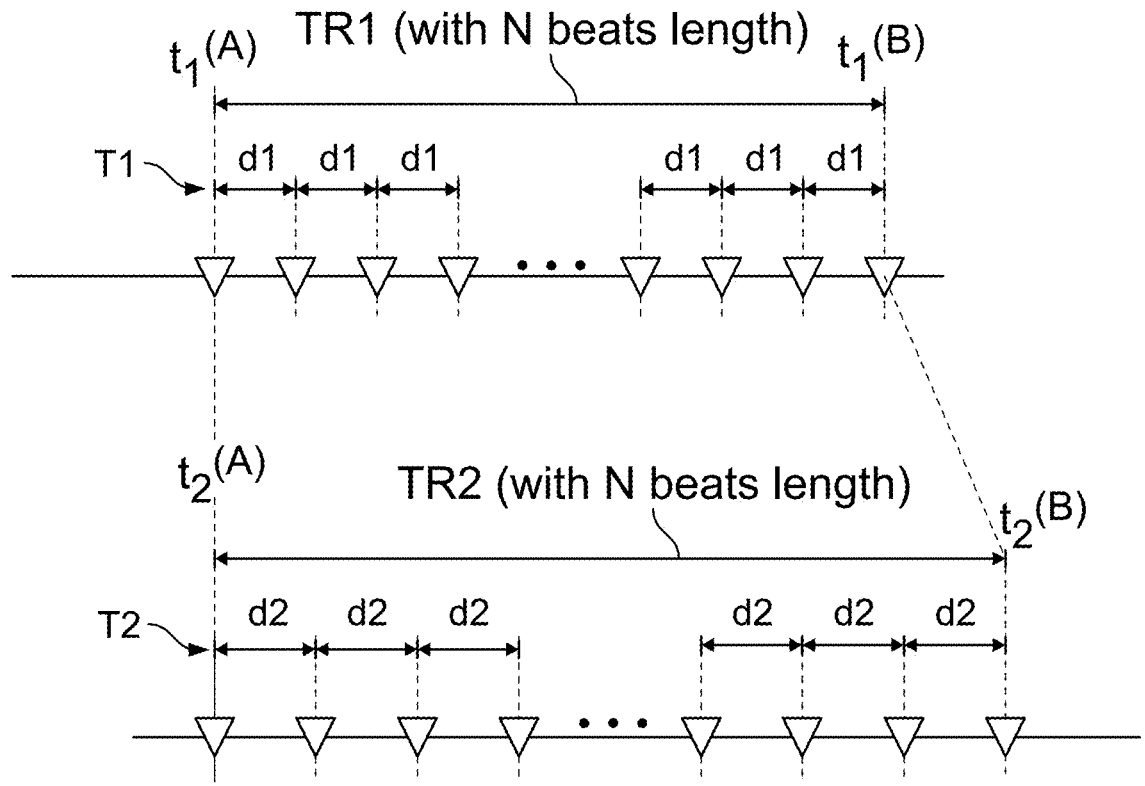
FIG. 20 illustrates example alignment of the first track and the second track.

As illustrated in FIG. 20, where an N beat transition is performed, the nth beat in the first track T1 has duration $d_1$ and the nth beat in the second track T2 has duration d2, the total duration of the new nth beat can be calculated by:

$$d_{out} = \frac{N-n}{N}d_1 + \frac{n}{N}d_2.$$

Then, the first factor F1 is calculated by $d_1/d_{out}$, and the second factor F2 is calculated by $d_2/d_{out}$.

At operations 506 and 508, the media delivery system 104 operates to time-stretch the beats in the first and second tracks T1 and T2 by the first and second factors F1 and F2. In this example, the nth beat in the first track is time-stretched by the first factor F1, $d_1/d_{out}$, and the nth beat in the second track is time-stretched by the second factor F2, $d_2/d_{out}$.

At operation 510, the media delivery system 104 operates to align the first transition portion TR1 of the first track T1 with the second transition portion TR2 of the second track T2 by matching at least one of the beats from the first transition portion TR1 and the second transition portion TR2.

Figure 21:
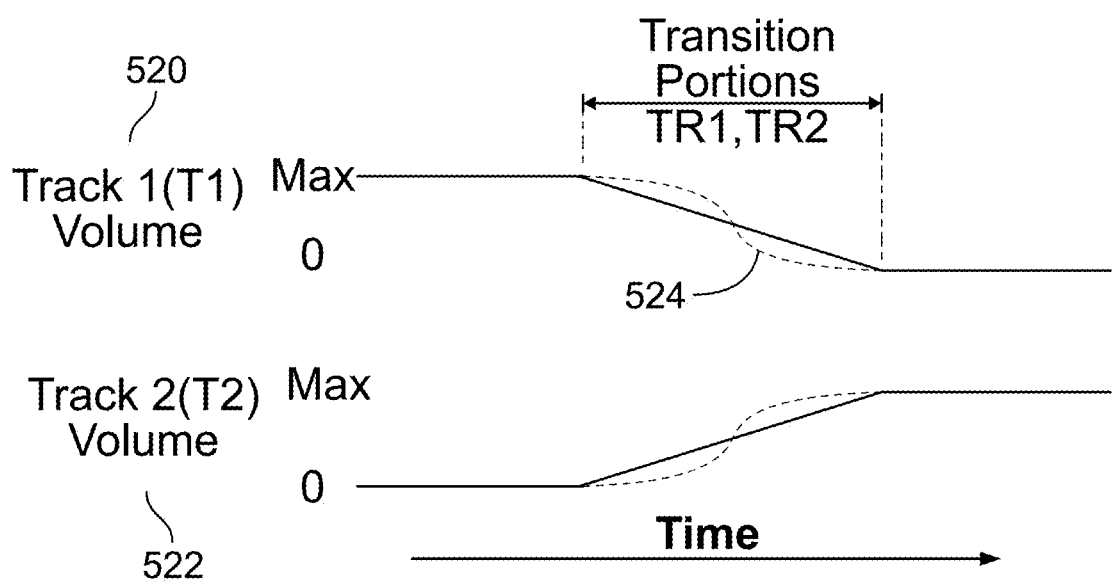
FIG. 21 illustrates an example crossfading between the first track and the second track.

As illustrated in FIG. 21, during the transition portions TR1 and TR2, the volume of the two tracks may be cross-faded. As shown in diagram 520, the volume of the first track T1 may be reduced linearly or nonlinearly as indicated by the dashed line 524. Simultaneously, as shown in the diagram 522, the volume of the second track T2 may be increased linearly or nonlinearly. The increase and decrease of the volumes of the first and second tracks T1 and T2, respectively, may be coordinated such that the overall volume heard by a listener remains essentially constant, which may be known as equal power cross-fading.

Although the method 500 is primarily described for one time-stretching example, other methods can also be possible. For example, in an echo transition, the beat at $t_1^{(B)}$ is time-stretched to the duration of the beat at $t_1^{(A)}$ and repeated. In a cut transition, the first track can end at $t_1^{(B)}$ and the second track can begin at $t_2^{(B)}$.

Referring now to FIGS. 22 and 23, in certain examples, the system of the present disclosure can be used to play back a plurality of media content items to continuously support a user's repetitive motion activity without distracting the user's cadence.

Users of media playback devices often consume media content while engaging in various activities, including repetitive motion activities. As noted above, examples of repetitive-motion activities may include swimming, biking, running, rowing, and other activities. Consuming media content may include one or more of listening to audio content, watching video content, or consuming other types of media content. For ease of explanation, the embodiments described in this application are presented using specific examples. For example, audio content (and in particular music) is described as an example of one form of media consumption. As another example, running is described as one example of a repetitive-motion activity. However, it should be understood that the same concepts are equally applicable to other forms of media consumption and to other forms of repetitive-motion activities, and at least some embodiments include other forms of media consumption and/or other forms of repetitive-motion activities.

The users may desire that the media content fits well with the particular repetitive activity. For example, a user who is running may desire to listen to music with a beat that corresponds to the user's cadence. Beneficially, by matching the beat of the music to the cadence, the user's performance or enjoyment of the repetitive-motion activity may be enhanced. This desire cannot be met with traditional media playback devices and media delivery systems.

FIG. 22 illustrates an example system 1000 for managing transitions between media content items to continuously support a repetitive motion activity. In some embodiments, the system 1000 is configured similarly to the system 100 as described herein. Therefore, the description for all the features and elements in the system 100 are incorporated by reference for the system 1000. Where like or similar features or elements are shown, the same reference numbers will be used where possible. The following description for the system 1000 will be limited primarily to the differences from the system 100.

In the system 1000, the media playback device 102 further includes a cadence-based media content crossfade engine 1112 and a cadence-acquiring device 1114. Also shown are a user U who is running. The user U's upcoming steps S are shown as well. A step represents a single strike of the runner's foot upon the ground.

The media playback device 102 can play media content for the user based on the user's cadence. In the example shown, the media output 108 includes music with a tempo that corresponds to the user's cadence. The tempo (or rhythm) of music refers to the frequency of the beat and is typically measured in beats per minute (BPM). The beat is the basic unit of rhythm in a musical composition (as determined by the time signature of the music). Accordingly, in the example shown, the user U's steps occur at the same frequency as the beat of the music.

For example, if the user U is running at a cadence of 180 steps per minute, the media playback device 102 may play a media content item having a tempo equal to or approximately equal to 180 BPM. In other embodiments, the media playback device 102 plays a media content item having a tempo equal or approximately equal to the result of dividing the cadence by an integer such as a tempo that is equal to or approximately equal to one-half (e.g., 90 BPM when the user is running at a cadence of 180 steps per minute), one-fourth, or one-eighth of the cadence. Alternatively, the media playback device 102 plays a media content item having a tempo that is equal or approximately equal to an integer multiple (e.g., 2×, 4×, etc.) of the cadence. Further, in some embodiments, the media playback device 102 operates to play multiple media content items including one or more media content items having a tempo equal to or approximately equal to the cadence and one or more media content items have a tempo equal or approximately equal to the result of multiplying or dividing the cadence by an integer. Various other combinations are possible as well.

In some embodiments, the media playback device 102 operates to play music having a tempo that is within a predetermined range of a target tempo. In at least some embodiments, the predetermined range is plus or minus 2.5 BPM. For example, if the user U is running at a cadence of 180 steps per minute, the media playback device 102 operates to play music having a tempo of 177.5-182.5 BPM. Alternatively, in other embodiments, the predetermined range is itself in a range from 1 BPM to 10 BPM. Other ranges of a target tempo are also possible.

Further, in some embodiments, the media content items that are played back on the media playback device 102 have a tempo equal to or approximately equal to a user U's cadence after it is rounded. For example, the cadence may be rounded to the nearest multiple of 2.5, 5, or 10 and then the media playback device 102 plays music having a tempo equal to or approximately equal to the rounded cadence. In yet other embodiments, the media playback device 102 uses the cadence to select a predetermined tempo range of music for playback. For example, if the user U's cadence is 181 steps per minute, the media playback device 102 may operate to play music from a predetermined tempo range of 180-184.9 BPM; while if the user U's cadence is 178 steps per minute, the media playback device 102 may operate to play music from a predetermined tempo range of 175-179.9 BPM.

Referring still to FIG. 22, the cadence-acquiring device 1114 operates to acquire a cadence associated with the user U. In at least some embodiments, the cadence-acquiring device 1114 operates to determine cadence directly and includes one or more accelerometers or other motion-detecting technologies. Alternatively, the cadence-acquiring device 1114 operates to receive data representing a cadence associated with the user U. For example, in some embodiments, the cadence-acquiring device 1114 operates to receive data from a watch, bracelet, foot pod, chest strap, shoe insert, anklet, smart sock, bicycle computer, exercise equipment (e.g., treadmill, rowing machine, stationary cycle), or other device for determining or measuring cadence. Further, in some embodiments, the cadence-acquiring device 1114 operates to receive a cadence value input by the user U or another person.

FIG. 23 illustrates an example of the media delivery system 104 of FIG. 22 for managing transitions between media content items to continuously support a repetitive motion activity. In the system 1000, the media delivery system 104 further includes a media server 1200 and a repetitive-motion activity server 1202. The media server 1200 includes the media server application 150, the processing device 152, the memory device 154, and the network access device 156, as described herein.

In at least some embodiments, the media server 1200 and the repetitive-motion activity server 1202 are provided by separate computing devices. In other embodiments, the media server 1200 and the repetitive-motion activity server 1202 are provided by the same computing devices. Further, in some embodiments, one or both of the media server 1200 and the repetitive-motion activity server 1202 are provided by multiple computing devices. For example, the media server 1200 and the repetitive-motion activity server 1202 may be provided by multiple redundant servers located in multiple geographic locations.

The repetitive-motion activity server 1202 operates to provide repetitive-motion activity-specific information about media content items to media playback devices. In some embodiments, the repetitive-motion activity server 1202 includes a repetitive-motion activity server application 1220, a processing device 1222, a memory device 1224, and a network access device 1226. The processing device 1222, memory device 1224, and network access device 1226 may be similar to the processing device 152, memory device 154, and network access device 156 respectively, which have each been previously described.

In some embodiments, repetitive-motion activity server application 1220 operates to transmit information about the suitability of one or more media content items for playback during a particular repetitive-motion activity. The repetitive-motion activity server application 1220 includes a repetitive-motion activity interface 1228 and a repetitive-motion activity media metadata store 1230.

In some embodiments, the repetitive-motion activity server application 1220 may provide a list of media content items at a particular tempo to a media playback device in response to a request that includes a particular cadence value. Further, in some embodiments, the media content items included in the returned list will be particularly relevant for the repetitive motion activity in which the user is engaged (for example, if the user is running, the returned list of media content items may include only media content items that have been identified as being highly runnable).

The repetitive-motion activity interface 1228 operates to receive requests or other communication from media playback devices or other systems to retrieve information about media content items from the repetitive-motion activity server 1202. For example, in FIG. 2, the repetitive-motion activity interface 1228 receives communication 184 from the media playback engine 146.

In some embodiments, the repetitive-motion activity media metadata store 1230 stores repetitive-motion activity media metadata 1232. The repetitive-motion activity media metadata store 1230 may comprise one or more databases and file systems. Other embodiments are possible as well.

The repetitive-motion activity media metadata 1232 operates to provide various information associated with media content items, such as the media content items 170. In some embodiments, the repetitive-motion activity media metadata 1232 provides information that may be useful for selecting media content items for playback during a repetitive-motion activity. For example, in some embodiments, the repetitive-motion activity media metadata 1232 stores runnability scores for media content items that corresponds to the suitability of particular media content items for playback during running. As another example, in some embodiments, the repetitive-motion activity media metadata 1232 stores timestamps (e.g., start and end points) that identify portions of a media content items that are particularly well-suited for playback during running (or another repetitive-motion activity).

Each of the media playback device 102 and the media delivery system 104 can include additional physical computer or hardware resources. In at least some embodiments, the media playback device 102 communicates with the media delivery system 104 via the network 106.

In at least some embodiments, the media delivery system 104 can be used to stream, progressively download, or otherwise communicate music, other audio, video, or other forms of media content items to the media playback device 102 based on a cadence acquired by the cadence-acquiring device 1114 of the media playback device 102. In accordance with an embodiment, a user U can direct the input to the user interface 144 to issue requests, for example, to playback media content corresponding to the cadence of a repetitive motion activity on the media playback device 102.

The media mix data generation engine 1240 operates to generate media mix data to be used for crossfading cadence-based media content items. As described herein, such media mix data can be incorporated in repetitive-motion activity media metadata 1232.

In this example, the media content transition engine 110 operates to make smooth transitions between different media content items which are played on the media playback device 102 during a user's repetitive motion activity. The crossfade engine 1112 is configured to overlap at least portion of media content items based on mix-in and mix-out points generated by the media mix data generation engine 1240, thereby maintaining a constant output level to continuously support the user's repetitive motion activity without interruption.

The various examples and teachings described above are provided by way of illustration only and should not be construed to limit the scope of the present disclosure. Those skilled in the art will readily recognize various modifications and changes that may be made without following the examples and applications illustrated and described herein, and without departing from the true spirit and scope of the present disclosure.

What is claimed is:

1. A method of playing back media content items, the method comprising:
receiving a selection of a first media content item and a second media content item;
enabling playback of the first media content item on a media playback device;
obtaining a first set of features associated with the first media content item and a second set of features associated with the second media content item, wherein at least one feature in the first set of features and the second set of features includes a drop point, the drop point being a point in time of the first media content item and the second media content item at which a change occurs following a build;
comparing the first set of features and the second set of features to determine similarities;
based on the comparison, selecting a first transition portion of the first media content item and a second transition portion of the second media content item;
determining an alignment of the first transition portion of the first media content item with the second transition portion of the second media content item; and
enabling playback of the second media content item on the media playback device based on the determined alignment.

2. The method of claim 1, wherein the first set of features and the second set of features include beat positions, event locations, and beat-synchronous features.

3. The method of claim 2, wherein the event locations include at least one of downbeat positions, section boundaries, and drop points.

4. The method of claim 2, wherein the beat-synchronous features include at least one of timber features, chroma features, loudness features, and vocalness features.

5. The method of claim 1, wherein obtaining the drop point comprises:
monitoring user behaviors on playback of each of the first media content item and the second media content item;
obtaining playhead scrubbing data for the first media content item and the second media content item based on the monitored user behaviors;
determining one or more points in the first media content item and the second media content item at which playhead scrubbing values satisfy a threshold; and
identifying the one or more determined points as drop points.

6. The method of claim 1, wherein the first media content item and the second media content item each comprise a plurality of portions, and obtaining the first set of features and the second set of features comprises:
obtaining a first set of features for each of one or more portions of the plurality of portions of the first media content item; and
obtaining a second set of features for each of one or more portions of the plurality of portions of the second media content item.

7. The method of claim 6, wherein comparing the first set of features and the second set of features to determine similarities comprises:
comparing the first set of features for each of the one or more portions of the first media content item to each of the second set of features for each of the one or more portions of the second media content item; and
based on the comparison, determining a score representing a difference between the first set of features and the second set of features for each of the compared portions of the first media content item and the second media content item, wherein the selected first transition portion of the first media content item and the second transition portion of the second media content item are the compared portions of the first media content item and the second media content item having a lowest score.

8. The method of claim 1, wherein selecting the first transition portion of the first media content item comprises selecting the first transition portion of the first media content item from a predetermined portion of the first media content item, wherein the predetermined portion is at an end of the first media content item.

9. The method of claim 1, wherein selecting the second transition portion of the second media content item comprises selecting the second transition portion of the first media content item from a predetermined portion of the second media content item, wherein the predetermined portion is at a beginning of the second media content item.

10. The method of claim 1, further comprising:
determining a length of the first transition portion and the second transition portion based in part on the determined similarities from the comparison of the first set of features and the second set of features.

11. The method of claim 1, wherein enabling the playback of the second media content item on the media playback device based on the determined alignment comprises causing an automatic transition from the first transition portion of the first media content item being played back on the media playback device to the second transition portion of the second media content item based on the alignment.

12. The method of claim 1, wherein the first transition portion and the second transition portion include a start and an end, and determining the alignment of the first transition portion of the first media content item with the second transition portion of the second media content item comprises determining to one of:
align a start of the first transition portion of the first media content item with a start of the second transition portion of the second media content item;
align an end of the first transition portion of the first media content item with an end of the second transition portion of the second media content item; or
align the start and the end of the first transition portion of the first media content item with the start and the end of the second transition portion of the second media content item.

13. The method of claim 1, further comprising:
time-stretching at least one of the first media content item and the second media content item at least at or near the first transition portion and the second transition portion to match a tempo of the first media content item and a tempo of the second media content item.

14. A system for determining a transition between media content items for playback on a media playback device, the system comprising:
a processing device; and
a memory storing instructions that, when executed by the processing device, causes the system to:
receive a selection of a first media content item and a second media content item;
obtain a first set of features associated with the first media content item and a second set of features associated with the second media content item, wherein at least one feature in the first set of features and the second set of features includes a drop point, the drop point being a point in time of the first media content item and the second media content item at which a change occurs following a build;
compare the first set of features and the second set of features to determine similarities;
based on the comparison, select a first transition portion of the first media content item and a second transition portion of the second media content item; and
determine an alignment of the first transition portion of the first media content item with the second transition portion of the second media content item.

15. The system of claim 14, wherein the system is further caused to enable sequential playback of the first media content item and the second media content item on the media playback device based on the determined alignment.

16. The system of claim 15, wherein the system further causes an automatic transition from the first transition portion of the first media content item being played back on the media playback device to the second transition portion of the second media content item based on the determined alignment.

17. The system of claim 15, wherein the first set of features and the second set of features are obtained while the first media content is being played back on the media playback device.

18. The system of claim 14, wherein the selection of the first media content item and the second media content item for playback on the media playback device is a manual selection received from a user.

19. The system of claim 14, wherein the selection of the first media content item and the second media content item for playback on the media playback device is an automatic selection from a media content item database of the system, the automatic selection based on a determined similarity of characteristics of the first media content item and the second media content item.

20. A computer readable storage device storing instructions that, when executed by a processing device, cause the processing device to:
receive a selection of a first media content item and a second media content item;
enable playback of the first media content item on a media playback device;
obtain a first set of features associated with the first media content item and a second set of features associated with the second media content item, wherein at least one feature in the first set of features and the second set of features includes a drop point, the drop point being a point in time of the first media content item and the second media content item at which a change occurs following a build;
compare the first set of features and the second set of features to determine similarities;
based on the comparison, select a first transition portion of the first media content item and a second transition portion of the second media content item;
determine an alignment of the first transition portion of the first media content item with the second transition portion of the second media content item; and
enable playback of the second media content item on the media playback device based on the alignment.

* * * * *